(12) United States Patent
Choi

(10) Patent No.: US 11,942,089 B2
(45) Date of Patent: Mar. 26, 2024

(54) ELECTRONIC APPARATUS FOR RECOGNIZING VOICE AND METHOD OF CONTROLLING THE SAME

(71) Applicant: SAMSUNG ELECTRONICS CO., LTD., Suwon-si (KR)

(72) Inventor: Chanhee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 291 days.

(21) Appl. No.: 17/471,512

(22) Filed: Sep. 10, 2021

(65) Prior Publication Data

US 2022/0076676 A1 Mar. 10, 2022

Related U.S. Application Data

(63) Continuation of application No. PCT/KR2021/008867, filed on Jul. 12, 2021.

(30) Foreign Application Priority Data

Sep. 9, 2020 (KR) .................. 10-2020-0115592

(51) Int. Cl.
*G10L 15/22* (2006.01)
*G10L 15/02* (2006.01)
*G10L 15/30* (2013.01)
*G10L 25/51* (2013.01)

(52) U.S. Cl.
CPC .............. *G10L 15/22* (2013.01); *G10L 15/02* (2013.01); *G10L 15/30* (2013.01); *G10L 25/51* (2013.01); *G10L 2015/223* (2013.01)

(58) Field of Classification Search
CPC ......... G10L 15/22; G10L 15/02; G10L 15/30; G10L 25/51; G10L 2015/223
USPC ......................................................... 704/251
See application file for complete search history.

(56) References Cited

U.S. PATENT DOCUMENTS

| | | | | |
|---|---|---|---|---|
| 11,417,327 | B2 * | 8/2022 | Choi | ................. G10L 15/063 |
| 2016/0063995 | A1 | 3/2016 | Choi et al. | |
| 2016/0148613 | A1 | 5/2016 | Kwon et al. | |
| 2017/0287492 | A1 | 10/2017 | Stewart et al. | |

(Continued)

FOREIGN PATENT DOCUMENTS

| | | |
|---|---|---|
| KR | 10-2016-0060405 A | 5/2016 |
| KR | 10-1888058 B1 | 8/2018 |
| KR | 10-2019-0096860 A | 8/2019 |

OTHER PUBLICATIONS

International Search Report (PCT/ISA/210) and Written Opinion (PCT/ISA/237) dated Oct. 21, 2021 by the International Searching Authority in International Application No. PCT/KR2021/008867.

(Continued)

*Primary Examiner* — Susan I Mcfadden
(74) *Attorney, Agent, or Firm* — Sughrue Mion, PLLC

(57) ABSTRACT

Disclosed is an electronic apparatus which may receive a user voice of a user to be registered as a start command for activating a speech recognition function of the electronic apparatus; identify whether the user voice is misrecognized as a reference audio, wherein the reference audio includes a voice uttered by a user with high frequency from among a plurality of voices previously uttered by the user; and based on the user voice being not misrecognized as the reference audio, register the user voice as the start command.

20 Claims, 13 Drawing Sheets

(56) References Cited

U.S. PATENT DOCUMENTS

2020/0160863 A1 5/2020 Lee et al.
2020/0168223 A1 5/2020 Choi

OTHER PUBLICATIONS

Communication dated Nov. 6, 2023, issued by the European Patent Office in counterpart European Application No. 21866974.5.

* cited by examiner

ELECTRONIC APPARATUS FOR RECOGNIZING VOICE AND METHOD OF CONTROLLING THE SAME

CROSS-REFERENCE TO THE RELATED APPLICATIONS

This application is a bypass continuation application of International Patent Application No. PCT/KR2021/008867 filed on Jul. 12, 2021, which is based on and claims priority under 35 U. S. C. § 119 to Korean Patent Application No. 10-2020-0115592, filed on Sep. 9, 2020, the disclosures of which are herein incorporated by reference in their entireties.

TECHNICAL FIELD

The disclosure relates to an electronic apparatus for recognizing voice and a control method thereof, and more particularly to an electronic apparatus, in which a start command is registered to activate a speech recognition function of the electronic apparatus, and a method of controlling the same.

BACKGROUND ART

Efforts have recently been made to improve practical use of a start command and convenience in using a speech recognition function by allowing a user to voluntarily register the start command. The start command refers to a specific command for activating the speech recognition function. When the speech recognition function is activated by the start command, the speech recognition function is implemented with regard to voice commands received after the activation and an operation is carried out based on a recognition result.

A voluntary start command is likely to be misrecognized due to the user's voluntary choice of the start command, and therefore its suitability is verified during a registration process in order to avoid that the speech recognition function is unintentionally activated due to the misrecognition of the start command. However, a large amount of data is used in verifying the suitability, thereby causing a problem of lowering a resource efficiency and a verification speed. Further, a large amount of less-relevant data is used in verifying the suitability, thereby lowering a verification accuracy of the suitability to prevent the misrecognition.

Accordingly, a method has been requested to improve the resource efficiency, the verification speed and the suitability accuracy, and further improve the practical use of the start command and the convenience in using the speech recognition function by optimizing data used in a registration process of a user's voluntary start command and performing the suitability verification based on the optimized data.

Technical Problem

Accordingly, an aspect of the disclosure is to provide an electronic apparatus and a method of controlling the same, in which data used in a registration process of a user's voluntary start command is optimized and suitability verification is performed based on the optimized data, thereby improving a resource efficiency, a verification speed and a suitability accuracy, and further improving practical use of the start command and convenience in using a speech recognition function.

Technical Solution

According to an embodiment of the disclosure, there is provided an electronic apparatus including a processor configured to: receive a user voice of a user to be registered as a start command for activating a speech recognition function of the electronic apparatus; identify whether the user voice is misrecognized as a reference audio comprising a voice uttered with high frequency from among a plurality of voices previously uttered by the user; and based on the user voice being not misrecognized as the reference audio, register the user voice as the start command.

Data of the reference audio may include data about at least one of a user utterance characteristic or a user utterance history.

Data of the reference audio may include data obtained based on an account of the user.

Data of the reference audio may include data of a text input in relation to the user.

Data of the reference audio may include data of another user.

Data of the reference audio may include data of another start command registered in an external apparatus different from the electronic apparatus.

The reference audio may include an audio obtained around the electronic apparatus.

The processor may be further configured to identify whether the user voice is misrecognized as the reference audio based on similarity in audio features between the user voice and the reference audio.

The processor is further configured to identify whether the user voice is misrecognized as the reference audio based on a length of a word contained in the user voice.

The processor is further configured to group the reference audio into a plurality of groups based on functions of the electronic apparatus, and identify whether the user voice is misrecognized as the reference audio based on the reference audio of the group corresponding to the user voice.

According to an embodiment of the disclosure, there is provided an electronic apparatus including: an interface; and a processor configured to: receive, from an external apparatus through the interface, information about a user voice of a user to be registered as a start command for activating a speech recognition function of the external apparatus; identify whether the user voice is misrecognized as a reference audio comprising a voice uttered with high frequency from among a plurality of voices previously uttered by the user; and control the interface to transmit, to the external apparatus, information about whether the user voice is not misrecognized as the reference audio.

According to an embodiment of the disclosure, there is provided a method of controlling an electronic apparatus, the method including: receiving a user voice of a user to be registered as a start command for activating a speech recognition function of the electronic apparatus; identifying whether the user voice is misrecognized as a reference audio comprising a voice uttered with high frequency from among a plurality of voices previously uttered by the user; and based on the user voice being not misrecognized as the reference audio, registering the user voice as the start command.

Data of the reference audio may include data about at least one of a user utterance characteristic or a user utterance history.

Data of the reference audio may include data obtained based on an account of the user.

Data of the reference audio may include data of a text input in relation to the user.

Data of the reference audio may include data of another user.

Data of the reference audio may include data of another start command registered in an external apparatus different from the electronic apparatus.

The reference audio may include an audio obtained around the electronic apparatus.

According to an embodiment of the disclosure, there is provided a method of controlling an electronic apparatus, the method including: receiving, from an external apparatus, information about a user voice of a user to be registered as a start command for activating a speech recognition function of the external apparatus; identifying whether the user voice is misrecognized as a reference audio comprising a voice uttered with high frequency from among a plurality of voices previously uttered by the user; and transmitting, to the external apparatus, information about whether the user voice is not misrecognized as the reference audio.

According to an embodiment of the disclosure, there is provided a non-transitory computer-readable storage medium storing a computer program that is executable at least one processor to perform a method of controlling an electronic apparatus, the method including: receiving a user voice of a user to be registered as a start command for activating a speech recognition function of the electronic apparatus; identifying whether the user voice is misrecognized as a reference audio comprising a voice uttered with high frequency from among a plurality of voices previously uttered by the user; and based on the user voice being not misrecognized as the reference audio, registering the user voice as the start command.

Advantageous Effects

According to the disclosure, there are provided an electronic apparatus and a method of controlling the same, in which data used in a registration process of a user's voluntary start command is optimized and suitability verification is performed based on the optimized data, thereby improving a resource efficiency, a verification speed and a suitability accuracy, and further improving practical use of the start command and convenience in using a speech recognition function.

DETAILED DESCRIPTION

Figure 1:
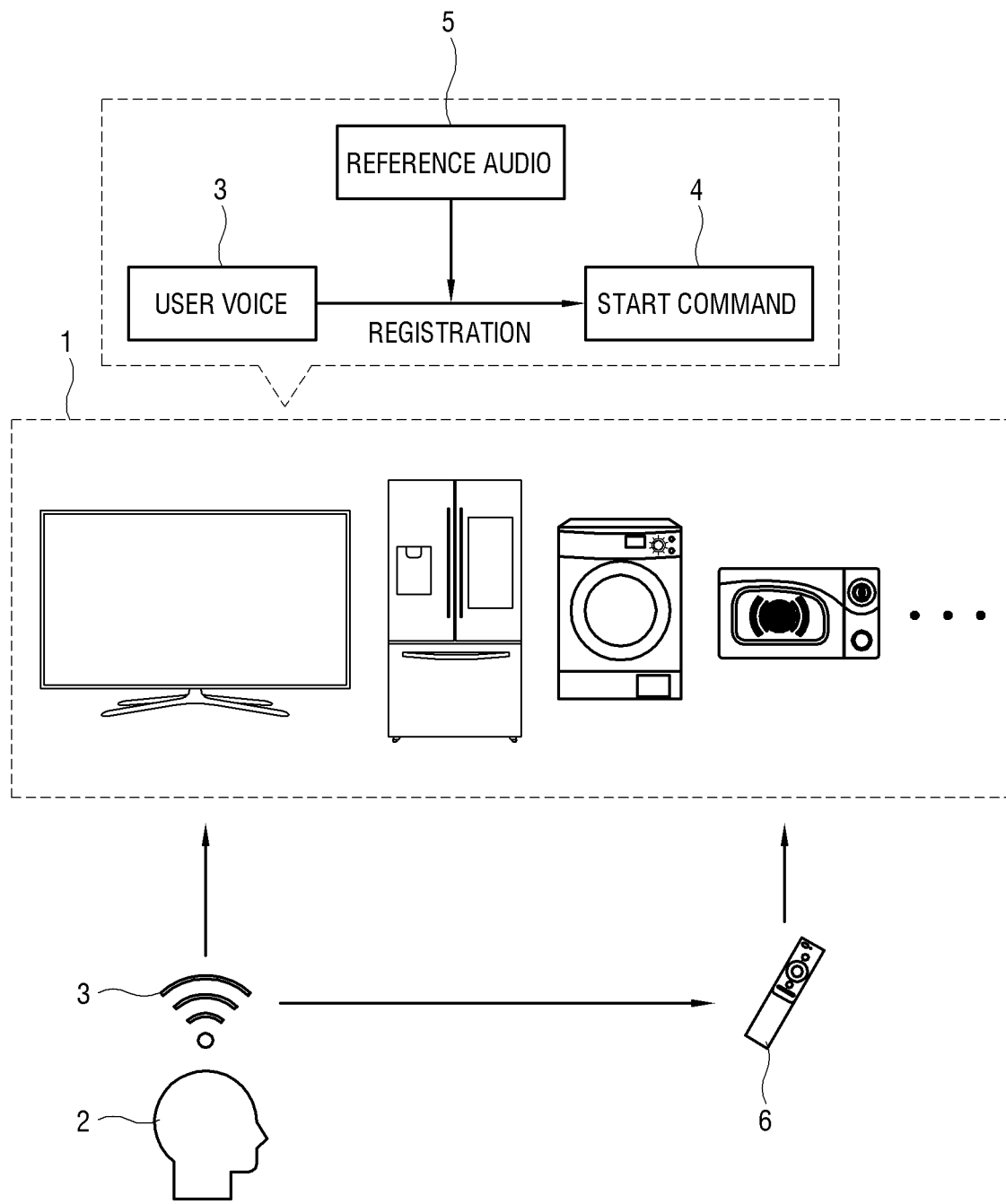
FIG. 1 illustrates an electronic apparatus according to an embodiment of the disclosure.

Below, example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

In the description of the following embodiments, elements illustrated in the accompanying drawings will be referenced, and like numerals or symbols set forth in the drawings refer to like elements having substantially the same operations. FIG. 1 illustrates an electronic apparatus according to an embodiment of the disclosure.

As shown in FIG. 1, an electronic apparatus 1 is embodied by any one of various kinds of apparatuses, including an image processing apparatus such as a set-top box, an image processing apparatus having no display, a home appliance such as a refrigerator, a washing machine or the like; an information processing apparatus such as a computer or a processor, a television (TV), a tablet computer, a portable media player (PMP), a wearable device, a video wall, an electronic frame, or the like image display apparatus. Further, the electronic apparatus 1 is embodied by an artificial intelligence (AI) loudspeaker, an AI robot, etc. with an AI function. There are no limits to the type of the electronic apparatus 1, and it will be described for convenience of description that the electronic apparatus 1 is embodied by the TV.

The electronic apparatus 1 performs a speech recognition function. The electronic apparatus 1 applies the speech recognition process to a voice command input by a user 2, obtains a recognition result of the speech recognition process, and performs an operation corresponding to the obtained recognition result.

The speech recognition process includes a speech-to-text (STT) process for converting the voice command into text data, and a command identification and execution process for identifying a command based on the text data and carrying out an operation based on the identified command. Although the electronic apparatus 1 can perform the whole speech recognition process, at least a part of the process may be performed in at least one server connected for communication with the electronic apparatus 1 through a network when a system load and a required storage capacity are taken into account. For example, at least one server performs the STT process, and the electronic apparatus 1 performs the command identification and execution process. Alternatively, at least one server may perform both the STT process and the command identification and execution process, and the electronic apparatus 1 may just receive a result from the at least one server.

The electronic apparatus 1 receives a voice command through an internal audio receiver 26 provided in a main body thereof (see FIG. 2) or through a remote controller 6 separated from the main body. In the case of using the remote controller 6, a voice signal corresponding to the voice command is received from the remote controller 6, and the speech recognition process is applied to the received voice signal.

The electronic apparatus 1 activates the speech recognition function based on a start command 4. The start command 4 refers to a specific command for activating the speech recognition function. When the speech recognition function is activated in response to the start command 4, the speech recognition function is performed with regard to a voice command received subsequently to the start command 4 and an operation is performed based on a recognition result as described above in connection with the implementation of the speech recognition function.

When a voice of the user 2 is input before activating the speech recognition function, the electronic apparatus 1 activates the speech recognition function based on whether the input voice of the user 2 matches the start command 4. The electronic apparatus 1 may identify whether the voice of the user 2 matches the start command 4 based on comparison in audio features between them. The audio features include at least one of a pattern, a tone, a volume, a speed, a frequency, a cycle, and an amplitude. The pattern may refer to the shapes of the tone, the volume, the speed, the frequency, the cycle, the amplitude, etc.

The start command 4 may be voluntarily registered by the user 2. Below, it will be described that the start command 4 is voluntarily registered. The electronic apparatus 1 receives a user voice 3 of the user 2. The user voice 3 may be received corresponding to the start or execution of the voluntary registration process. As described above in connection with the implementation of the speech recognition function, the user voice 3 is received through the internal audio receiver 26 or the remote controller 6. In the case of using the remote controller 6, the electronic apparatus 1 receives the voice signal corresponding to the user voice 3 from the remote controller 6.

The electronic apparatus 1 verifies whether the user voice 3 is suitable for the start command 4. For suitability verification, a reference audio 5 corresponding to the user 2 is used. The electronic apparatus 1 identifies whether the user voice 3 corresponds to the reference audio 5 for example based on lexical similarity between a word or phrase contained in the user voice 3, and a word or phrase contained in the reference audio 5, and thereby identifies whether the user voice 3 is likely to be misrecognized as the reference audio 5. The electronic apparatus 1 verifies the suitability of the user voice 3 for the start command 4 based on the identification of the misrecognition, for example, when the likelihood of misrecognizing the user voice 3 as the reference audio 5 is lower than a preset likelihood.

The suitability verification process may be performed when the user creates his or her own voice commands (e.g., a voice command for starting a navigation application installed on the electronic apparatus 1, a voice command for lowering the speaker volume of the electronic apparatus 1, etc.) as well as when the user 2 sets up the start command 4 for the speech recognition function. For example, if the user 2 utters the word "down" to register the word "down" as a customized voice command for lowering the speaker volume of the electronic apparatus 1, the electronic apparatus 1 may identify whether the word "down" or a similar word is included in the reference audio 5, and may not allow the word "down" to be used for the customized voice command if the word "down" or a similar word is included in the reference audio 5. Instead, the electronic apparatus 1 may request the user 2 to use a different word or phrase in setting up the customized voice command.

The reference audio 5 includes audio data or an audio model corresponding to the user 2, in which the audio model may be embodied by a hardware and/or software component.

The reference audio 5 may include an audio related to the unique characteristics of the user 2. For example, the unique characteristics of the user 2 may include an utterance history, an utterance characteristic, etc. of the user 2.

The reference audio 5 may be provided based on a voice of the user 2. The user 2 may include other users in addition to the user 2. For example, the reference audio 5 may be provided based on a voice command, a conversation, etc. of the user 2.

The reference audio 5 may be provided based on an audio received from surroundings. For example, the reference audio 5 may be provided based on noise or the like surrounding audio.

The reference audio 5 may be received through the internal audio receiver 26 or the remote controller 6, but the present embodiment is not limited thereto. Alternatively, the reference audio 5 may be based on data received from another external apparatus or a server 8 (see FIG. 2) through a network.

As described above, the reference audio 5 may be adaptively or variably configured according to the user 2, the surroundings, etc. and used in verifying the suitability. A process of using various reference audios 5 to verify the suitability will be described in detail with reference to FIGS. 4 to 8.

The reference audios 5 may be grouped based on a predetermined criterion. For example, the voices of the user 2 or the audios of the surroundings may be classified and grouped according to the user 2 or other users, and then the reference audios 5 grouped into the user 2 may be classified and grouped again according to the utterance history, the utterance characteristic, etc. of the user 2. Various criteria for grouping the reference audios 5 will be described in detail with reference to FIG. 9.

Meanwhile, the misrecognition identification forming the basis of the suitability verification may be performed by comparison in audio features between the user voice 3 and the reference audio 5. The audio features include at least one among the pattern, the tone, the volume, the speed, the frequency, the cycle and the amplitude as described above in connection with the voice of the user 2 for activating the speech recognition function. An example of the misrecognition identification will be described in detail with reference to FIG. 10.

The electronic apparatus 1 registers the user voice 3, which is identified as suitable for the start command 4 based on the misrecognition identification, as the start command 4. When the voice of the user 2 for activating the speech recognition function is received after the registration, it is identified whether the received voice matches the registered start command 4. When the voice of the user 2 matches the registered start command 4, the speech recognition function is activated.

Like this, the electronic apparatus 1 verifies whether the user voice 3 is suitable for the start command 4 during the voluntary registration process of the start command 4. To this end, the reference audio 5 corresponding to the user 2, in other words, the reference audio 5 optimized for the user 2 may be used.

Therefore, the suitability verification is performed based on valid reference audios 5 which are highly likely to be misrecognized for the user voice 3, thereby improving a resource efficiency, a verification speed and a verification accuracy, and improving practical use of the start command 4 and convenience in using the speech recognition function as compared with those of when the suitability verification is performed based on data of which probability of misrecognition is not taken into account.

Figure 2:
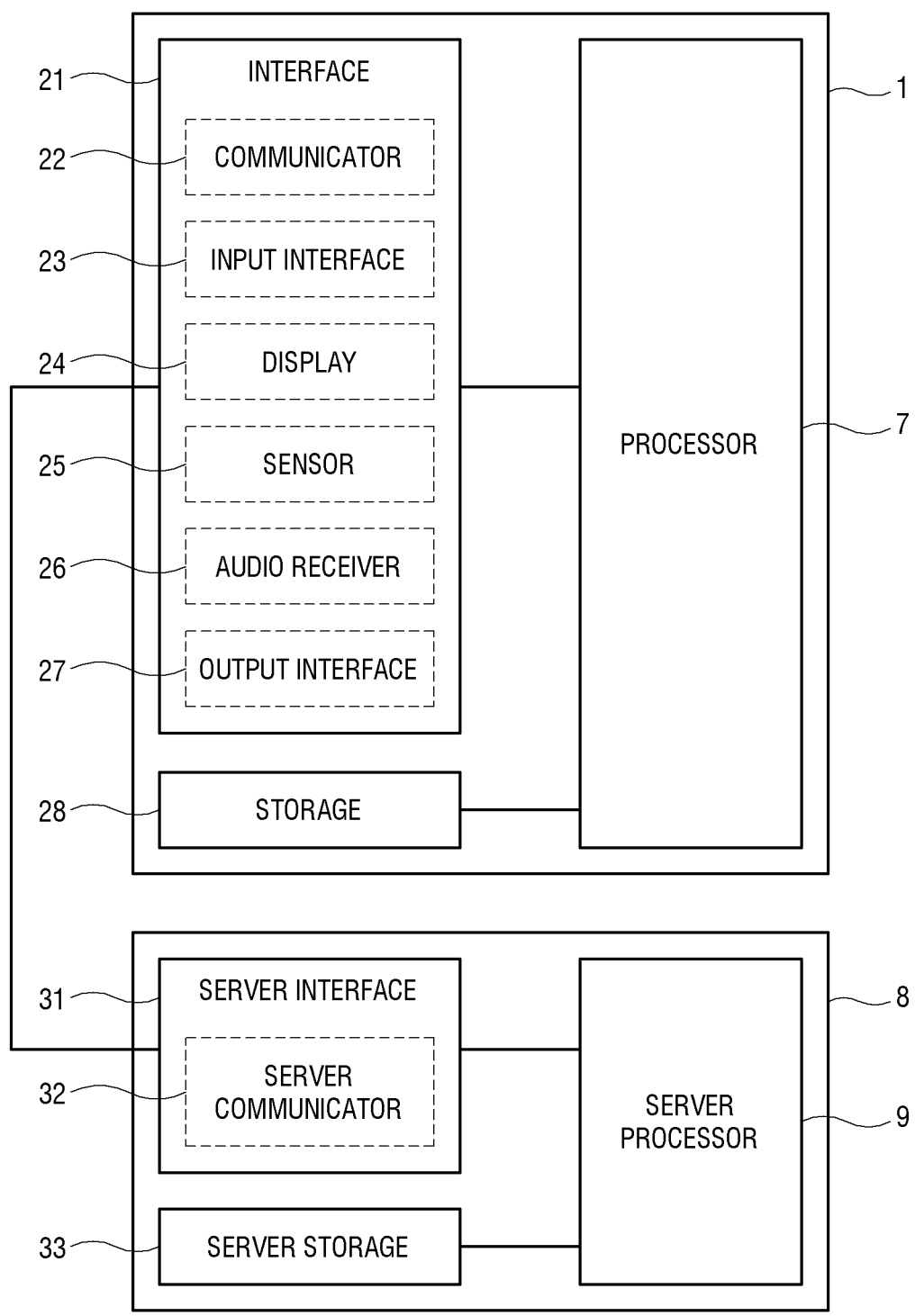
FIG. 2 illustrates exemplary configurations of the electronic apparatus of FIG. 1 and a server.

FIG. 2 illustrates an exemplary configuration of the electronic apparatus of FIG. 1 and a server.

Below, the configuration of the electronic apparatus 1 will be described with reference to FIG. 2. In this embodiment, it will be described that the electronic apparatus 1 is a TV. However, the electronic apparatus 1 may be embodied by various kinds of apparatuses, and this embodiment does not limit the configuration of the electronic apparatus 1. The electronic apparatus 1 may not be a display apparatus such as a TV, and may not include a display 24 or the like for displaying an image. For example, when the electronic apparatus 1 is embodied by a set-top box, the electronic apparatus 1 outputs an image signal to an external TV through an interface 21.

The electronic apparatus 1 includes the interface 21. The interface 21 connects the electronic apparatus 1 with the server 8, other external apparatuses and the like, and transmits and receives data. However, without limitations, the interface 21 may connect the electronic apparatus 1 with various apparatuses through a network.

The interface 21 includes a wired interface. The wired interface includes a connector or port to which an antenna for receiving a broadcast signal based on a terrestrial/satellite broadcast or the like broadcast standards is connectable, or a cable for receiving a broadcast signal based on cable broadcast standards is connectable. Alternatively, the electronic apparatus 1 may include a built-in antenna for receiving a broadcast signal. The wired interface includes a connector, a port, etc. based on video and/or audio transmission standards, like an HDMI port, DisplayPort, a DVI port, a thunderbolt, composite video, component video, super video, syndicat des constructeurs des appareils radiorécepteurs et téléviseurs (SCART), etc. The wired interface includes a connector, a port, etc. based on universal data transmission standards like a universal serial bus (USB) port, etc. The wired interface may include a connector, a port, etc. to which an optical cable based on optical transmission standards is connectable.

The wired interface includes a connector, a port, etc. to which an internal audio receiver 26 or an external audio device including the audio receiver 26 is connected, and which receives or inputs an audio signal from the audio device. The wired interface includes a connector, a port, etc. to which a headset, an earphone, an external loudspeaker or the like audio device is connected, and which transmits or outputs an audio signal to the audio device. The wired interface includes a connector or a port based on Ethernet or the like network transmission standards. For example, the wired interface is embodied by a local area network (LAN) card or the like connected to a router or a gateway by a wire.

The wired interface is connected to a set-top box, an optical media player or the like external apparatus or an external display apparatus, a loudspeaker, a server 8, etc. by a cable in a manner of one to one or one to N (where, N is a natural number) through the connector or the port, thereby receiving a video/audio signal from the corresponding external apparatus or transmitting a video/audio signal to the corresponding external apparatus. The wired interface may include connectors or ports to individually transmit video/audio signals.

The wired interface may be embodied as built in the electronic apparatus 1, or may be embodied in the form of a dongle or a module and detachably connected to the connector of the electronic apparatus 1.

The interface 21 includes a wireless interface. The wireless interface is embodied variously corresponding to the types of the electronic apparatus 1. For example, the wireless interface uses wireless communication based on radio frequency (RF), Zigbee, Bluetooth, Wi-Fi, ultra-wideband (UWB), near field communication (NFC) etc. The wireless interface is embodied by a wireless communication module that performs wireless communication with an access point (AP) based on Wi-Fi, a wireless communication module that performs one-to-one direct wireless communication such as Bluetooth, etc.

The wireless interface wirelessly communicates with a server 8 through a network to thereby transmit and receive a data packet to and from the server 8. The wireless interface includes an infrared (IR) transmitter and/or an IR receiver to transmit and/or receive an IR signal based on IR communication standards.

The wireless interface receives or inputs a remote control signal from a remote controller 6 or other external devices, or transmit or output the remote control signal to the remote controller 6 or other external devices through the IR transmitter and/or IR receiver. Alternatively, the electronic apparatus 1 may transmit and receive the remote control signal to and from the remote controller 6 or other external devices through the wireless interface based on Wi-Fi, Bluetooth or the like other standards.

The electronic apparatus 1 further includes a tuner to be tuned to a channel of a received broadcast signal, when a video/audio signal received through the interface 21 is a broadcast signal.

The electronic apparatus 1 includes a communicator 22. The communicator 22 is connected to the server 8, other external apparatuses or the like and transmits the video/audio signal. The communicator 22 may include at least one of the wired interface or the wireless interface, and performs at least one function of the wired interface or the wireless interface.

The electronic apparatus 1 include a input interface 23. The input interface 23 includes various kinds of circuits configured to recognize a user input from a user 2. The input interface 23 may be variously embodied according to the kind of electronic apparatus 1, and may include, for example, mechanical or electronic buttons mounted on the electronic apparatus 1, and a touch pad or a touch screen installed in the display 24, etc.

The electronic apparatus 1 includes the display 24. The display 24 includes a display panel for displaying an image on a screen. The display panel has a light-receiving structure like a liquid crystal type or a light-emitting structure like an OLED type. The display 24 may include an additional component according to the types of the display panel. For example, when the display panel is of the liquid crystal type, the display 24 includes a liquid crystal display (LCD) panel, a backlight unit for emitting light, a panel driving substrate for driving the liquid crystal of the LCD panel. However, as described above, the display 24 is omitted when the electronic apparatus 1 is embodied by a set-top box or the like.

The electronic apparatus 1 includes a sensor 25. The sensor 25 may detect objects in front of or in the vicinity of the electronic apparatus 1, and may detect the presence, motion, and the like of the user 2 or other electronic apparatuses. For example, the sensor 25 may be embodied by an image sensor, capturing an image in a frontward direction of the electronic apparatus 1, The sensor 25 may obtain information about the presence and motion of the user 2 or other electronic apparatuses from the captured image. The image sensor is embodied by a camera using a complementary metal oxide semiconductor (CMOS) or a charge coupled device (CCD). The sensor 25 may be embodied by an infrared sensor, measure time taken by an infrared signal output frontward to return back, and obtain information about the presence, motion, etc. of the user 2 or other electronic apparatuses.

The electronic apparatus 1 includes the audio receiver 26. The audio receiver 26 receives various audio signals. The audio receiver 26 receives a signal of the user voice 3, and also a signal of noise or the like surrounding audio. The audio receiver 26 transmits a collected audio signal, including the user voice 3 and the noise, to a processor 7. The audio receiver 26 is embodied by an internal microphone provided in the electronic apparatus 1 or an external microphone provided in the remote controller 6 separated from the main body of the electronic apparatus 1. When the audio receiver 26 is embodied by the external microphone, the audio signal received in the external microphone is digitalized and transmitted from the remote controller 6 to the processor 7 through the interface 21.

The remote controller 6 includes a smartphone or the like, and the smartphone or the like is installed with a remote controller application. The smartphone performs a function of the remote controller 6 with the installed application, for example, a function of controlling the electronic apparatus 1. Such a remote controller application is installable in various external apparatuses such as an AI loudspeaker, an AI robot, etc.

The electronic apparatus 1 includes an output interface 27. The output interface 27 outputs various audios based on an audio signal. The output interface 27 is embodied by an electroacoustic transducer, at least one loudspeaker, and an audio output port. The output interface 27 is embodied by an internal loudspeaker provided in the electronic apparatus 1 or an external loudspeaker provided at the outside. When the output interface 27 is embodied by the external loudspeaker, the electronic apparatus 1 transmits an audio signal to the external loudspeaker by a wire or wirelessly.

The input interface 23, the display 24, the sensor 25, the audio receiver 26, the output interface 27, etc. are provided separately from the interface 21, but may be designed to be included in the interface 21.

The electronic apparatus 1 includes a storage 28. The storage 28 is configured to store digitalized data. The storage 28 includes a nonvolatile storage in which data is retained regardless of whether power is on or off. The nonvolatile storage includes a flash memory, a hard-disc drive (HDD), a solid-state drive (SSD), a read only memory (ROM), etc.

The storage 28 includes a volatile memory into which data to be processed by the processor 7 is loaded and in which data is retained only when power is on. The memory includes a buffer, a random-access memory (RAM), etc.

The electronic apparatus 1 includes the processor 7. The processor 7 includes one or more hardware processors embodied as a central processing unit (CPU), a chipset, a buffer, a circuit, etc. which are mounted onto a printed circuit board, and may be designed as a system on chip (SOC). When the electronic apparatus 1 is embodied as a display apparatus, the processor 7 includes modules corresponding to various processes, such as a demultiplexer, a decoder, a scaler, an audio digital signal processor (DSP), an amplifier, etc. Here, some or all of such modules may be embodied as an SOC. For example, the demultiplexer, the decoder, the scaler and the like video processing modules may be embodied as a video processing SOC, and the audio DSP may be embodied as a chipset separated from the SOC.

The processor 7 receives the user voice 3 for registering the start command 4 to activate the speech recognition function of the electronic apparatus 1, identifies whether the user voice 3 is suitable for the start command 4 based on the misrecognition identification between the user voice 3 and the reference audio 5 corresponding to the user 2, and registers the user voice 3, which is identified as suitable for the start command 4, as the start command 4.

The configuration of the electronic apparatus 1 is not limited to that shown in FIG. 2, but may omit some elements from the foregoing configuration or include other elements in addition to the foregoing configuration.

Below, the configuration of the server 8 will be described in detail with reference to FIG. 2. The server 8 includes a server interface 31. As described above, the electronic apparatus 1 and the server 8 are connected through the interface 21 and the server interface 31, and exchange the data. The server interface 31 includes a wired interface and a wireless interface. The wired interface and the wireless interface are equivalent to those included in the interface 21 of the electronic apparatus 1, and thus repetitive descriptions thereof will be avoided as necessary.

The server 8 includes a server communicator 32. The server communicator 32 is connected to the electronic apparatus 1, other external apparatuses, etc. and transmits a video/audio signal. The server communicator 32 includes at least one of the wired interface or the wireless interface, and performs a function of the at least one of the wired interface or the wireless interface.

The server 8 includes a server storage 33. The server storage 33 is configured to store digitalized data. The server storage 33 includes a nonvolatile storage in which data is retained regardless of whether power is on or off. The nonvolatile storage includes a flash memory, a HDD, a SSD, a ROM, etc. The server storage 33 includes a volatile memory into which data to be processed by a server processor 9 is loaded and in which data is retained only when power is on. The memory includes a buffer, a RAM, etc.

The server 8 includes the server processor 9. The server processor 9 includes one or more hardware processors embodied as a CPU, a chipset, a buffer, a circuit, etc. which are mounted onto a printed circuit board, and may be designed as an SOC.

The server processor 9 receives information about the user voice 3 for registering the start command 4 to activate the speech recognition function of the electronic apparatus 1 from the electronic apparatus 1 through the server interface 31, identifies whether the user voice 3 is suitable for the start command 4 based on the misrecognition identification between the user voice 3 and the reference audio 5 corresponding to the user 2, and controls the server interface 31 to transmit the information about whether the user voice 3 is suitable for the start command 4 to the electronic apparatus 1.

The configuration of the server 8 is not limited to that shown in FIG. 2, but may omit some elements from the foregoing configuration or include other elements in addition to the foregoing configuration.

The processor 7 of the electronic apparatus 1 or the server processor 9 of the server 8 applies AI technology based on rules or using an AI algorithm to at least a part of analyzing and processing data and generating information about results to perform the foregoing operations, thereby building up an AI system.

The AI system refers to a computer system that has an intelligence level of a human, in which a machine learns and determines by itself, and gets higher recognition rates the more it is used. The AI algorithm refers to an algorithm that classifies/learns features of input data by itself.

The AI technology is based on elementary technology by using at least one of machine learning, neural network, or deep learning algorithm to copy perception, determination and the like functions of a human brain.

The elementary technology may include at least one of linguistic comprehension technology for recognizing a language and/or text of a human, visual understanding technology for recognizing an object like a human sense of vision, inference and/or prediction technology for identifying information and logically making inference and prediction, knowledge representation technology for processing experience information of a human into knowledge data, and motion control technology for controlling a vehicle's automatic driving or a robot's motion.

The linguistic comprehension refers to technology of recognizing and applying/processing a human's language and/or character, and includes natural language processing, machine translation, conversation system, question and answer, speech recognition and/or synthesis, etc. The visual understanding refers to technology of recognizing and processing an object like a human sense of vision, and includes object recognition, object tracking, image search, people recognition, scene understanding, place understanding, image enhancement, etc. The inference and/or prediction refers to technology of identifying information and logically making prediction, and includes knowledge-based interference, possibility-based inference, optimized prediction, preference-based plan, recommendation, etc. The knowledge representation refers to technology of automating a human's experience information into knowledge data, and includes knowledge building (data creation/classification), knowledge management (data utilization), etc.

Below, it will be described by way of example that the AI technology using the foregoing AI algorithm is achieved by the processor 7 of the electronic apparatus 1. However, the same AI technology may also be achieved by the server processor 9 of the server 8.

The processor 7 functions as both a learner and a recognizer. The learner performs a function of generating the learned neural network, and the recognizer performs a function of recognizing (inferring, predicting, estimating and identifying) the data based on the learned neural network.

The learner generates or updates the neural network. The learner obtains learning data to generate the neural network. For example, the learner obtains the learning data from the storage 8 or a server storage 33 or from the outside. The learning data may be data used for learning the neural network, and the data subjected to the foregoing operations may be used as the learning data to make the neural network learn.

Before making the neural network learn based on the learning data, the learner performs a preprocessing operation with regard to the obtained learning data or selects data to be used in learning among a plurality of pieces of the learning data. For example, the learner processes the learning data to have a preset format, apply filtering to the learning data, or processes the learning data to be suitable for the learning by adding/removing noise to/from the learning data. The learner uses the preprocessed learning data for generating the neural network which is set to perform the operations.

The learned neural network includes a plurality of neural networks or layers. The nodes of the plurality of neural networks have weight values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer obtains target data to carry out the foregoing operations. The target data is obtained from the storage 140 or from the outside. The target data may be data targeted to be recognized by the neural network. Before applying the target data to the learned neural network, the recognizer performs a preprocessing operation with respect to the obtained target data, or selects data to be used in recognition among a plurality of pieces of target data. For example, the recognizer processes the target data to have a preset format, apply filtering to the target data, or processes the target data into data suitable for recognition by adding/removing noise. The recognizer obtains an output value output from the neural network by applying the preprocessed target data to the neural network. Further, the recognizer obtains a stochastic value or a reliability value together with the output value.

Figure 3:
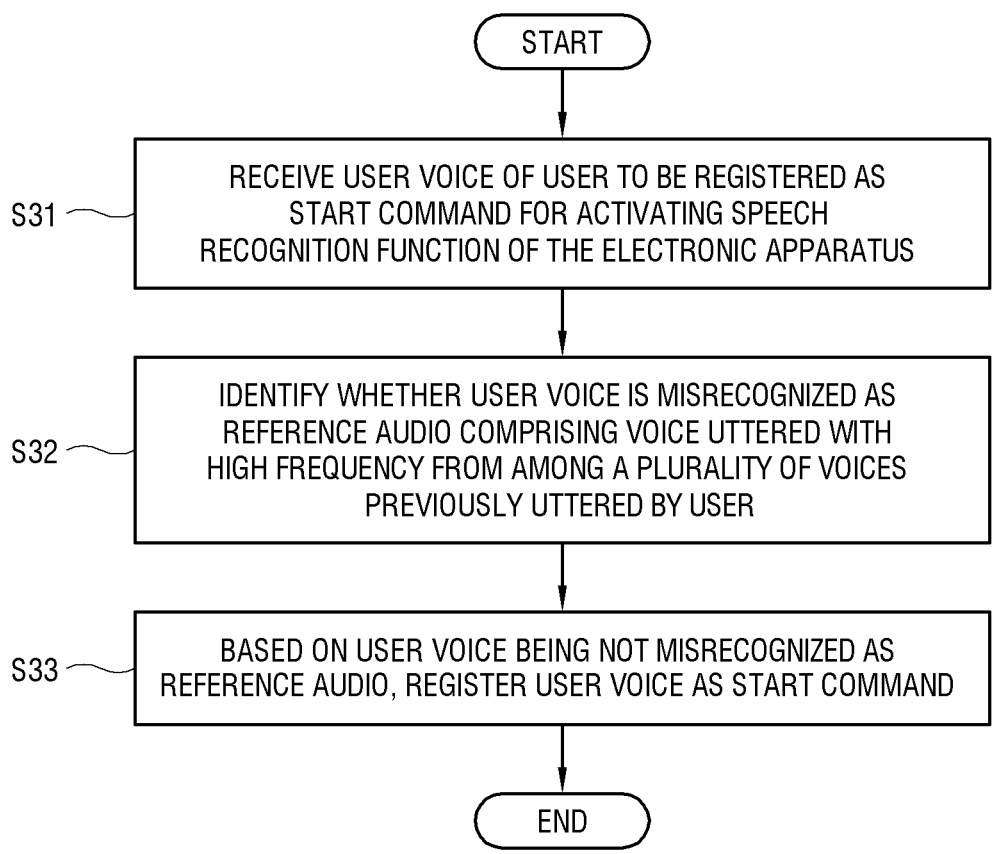
FIG. 3 illustrates an exemplary control method of the electronic apparatus of FIG. 1.

FIG. 3 illustrates an exemplary control method of the electronic apparatus of FIG. 1.

The operations set forth herein with reference to FIG. 3 are executed by the processor 7 of the electronic apparatus 1.

The processor 7 receives the user voice 3 of the user 2 for registering the start command 4 to activate the speech recognition function of the electronic apparatus 1 (operation S31).

The processor 7 identifies whether the user voice 3 is likely to be misrecognized as the reference audio 5, wherein the reference audio 5 includes a voice which is uttered by the user 2 with high frequency from among a plurality of voices previously uttered by the user 2 (operation S32). For example, the processor 7 may receive a plurality of voices uttered by the user 2 before the start command registration process, and may use at least one of the plurality of voices of the user 2 as the reference audio 5.

The processor 7 registers the user voice 3, which is not likely to be misrecognized as the reference audio 5, as the start command 4 (operation S33).

In this manner, the processor 7 may verify the suitability of the user voice 3 for the start command 4. To this end, the processor 7 uses the reference audio 5 corresponding to the user 2. In other words, the reference audio 5 optimized for the user 2 is used in the suitability verification, thereby improving a resource efficiency, a verification speed and a verification accuracy, and improving practical use of the start command 4 and convenience in using the speech recognition function.

Figure 4:
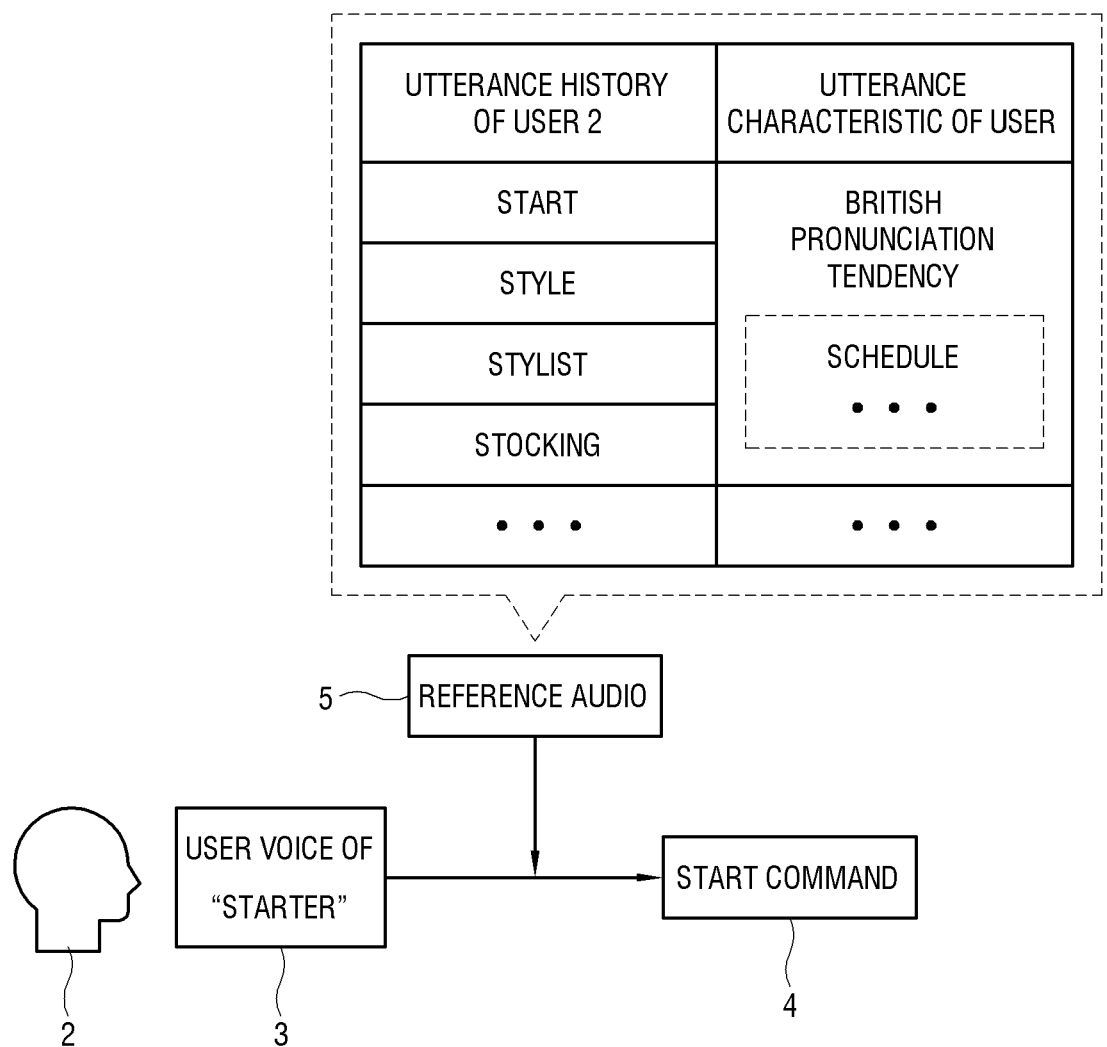
FIG. 4 illustrates an exemplary reference audio based on a user characteristic, in connection with operation S32 of FIG. 3.

FIG. 4 illustrates an exemplary reference audio based on a user characteristic, in connection with operation S32 of FIG. 3.

The processor 7 executes a voluntary registration process based on a voice command or menu selection of the user 2. However, without limitations, the processor 7 may execute the voluntary registration process by various methods. The processor 6 may display an execution image, which informs that the voluntary registration process is executed, on the display 24, or output an execution audio through the output interface 27.

When the user voice 3 of the user 2 is received, the processor 7 identifies the reference audio 5 according to characteristics of the user 2. The reference audio 5 may be previously prepared or given in real time, and the processor 7 may identify the reference audio 5, which matches the characteristics of the user 2, among such reference audios 5.

The processor 7 may first identify the user 2 in order to identify the reference audio 5 according to the characteristics of the user 2. The processor 7 may identify the user 2 based on an image obtained by the sensor 25, or may identify the user based on at least one among the accent, the pronunciation, the pattern, the tone, the volume, the speed, the frequency, the cycle, and the amplitude of the user voice 3. The pattern may refer to the shapes of the tone, the volume, the speed, the frequency, the cycle, the amplitude, etc.

The characteristics of the user 2 may include an utterance history and an utterance characteristic of the user 2. However, the characteristics of the user 2 are not limited to the utterance history and the utterance characteristic of the user 2, and therefore the characteristics of the user 2 include various characteristics that are unique to the user 2.

Below, for convenience of description, it will be described that the reference audio 5 based on the utterance history of the user 2 is used to perform the suitability verification on the assumption that the user 2 utters the user voice 3 of "STARTER" to voluntarily register the start command 4.

In the case of the utterance history of the user 2, the processor 7 identifies an audio, which corresponds to a voice previously uttered by the user 2, as the reference audio 5. For example, when the voices of "START", "STYLE", "STYLIST", "STOCKING", etc. have been uttered by the user 2, the processor 7 identifies "START" and the like audios as the reference audios 5. However, "START" and the like are given for convenience of description, and thus various reference audios 5 can be identified based on the utterance history.

The processor 7 may additionally take utterance frequency or the like into account when the reference audios 5 are identified based on the utterance history. For example, "START" or the like may be a voice of high utterance frequency among the voices previously uttered by the user 2.

The processor 7 performs misrecognition identification between the user voice 3 of "STARTER" and the reference audios 5 of "START", etc. based on the utterance history. To identify misrecognition probability between the user voice 3 of "STARTER" and the reference audio 5 of "START" or the like based on the utterance history, the misrecognition may be identified based on, for example, whether the user voice 3 of "STARTER" is recognized as the reference audio 5 of "START" based on the utterance history or, in a reverse manner, whether the reference audio 5 of "STYLE" is recognized as the user voice 3 of "STARTER".

The processor 7 identifies that the user voice 3 of "STARTER" is not suitable for the start command 4, when it is identified based on a misrecognition identification result that the misrecognition is possible. For example, when the user voice 3 of "STARTER" is recognized as corresponding to the reference audio 5 of "START" or the like based on the utterance history, or, in a reverse manner, when the reference audio 5 of "START" or the like is recognized as corresponding to the user voice 3 of "STARTER", the processor 7 identifies that the user voice 3 of "STARTER" is unsuitable for the start command 4, and does not register the user voice 3 of "STARTER" as the start command 4. The processor 7 may recognize that the user voice 3 of "STARTER" corresponds to the reference audio 5 of "START" based on the common root word "START" of the two different words, "STARTER" and "START."

On the other hand, when the user voice 3 of "SHEPPERTON" is received, it may be identified that the misrecognition between the user voice 3 of "SHEPPERTON" and the reference audio 5 based on the utterance history is not possible. For example, it may be identified that the user voice 3 of "SHEPPERTON" is not recognized as the reference audio 5 of "START" or the like based on the utterance history, or, in a reverse manner, that the reference audio 5 of "START" or the like is not recognized as the user voice 3 of "SHEPPERTON". The processor 7 identifies that the user voice 3 of "SHEPPERTON" is suitable for the start command 4, and registers the user voice 3 of "SHEPPERTON" as the start command 4.

Below, it will be described that the reference audio 5 based on the utterance characteristics of the user 2 is used to perform the suitability verification on the assumption that the user 2 utters the user voice 3 of "SCHEDULING" to register the start command 4.

The utterance characteristics of the user 2 include differences in a unique pronunciation tendency, an accent, a dialect, a tone, a volume, a speed, etc. between countries or regions. For example, when it is identified based on the user 2 or the user voice 3 that the user 2 has a British pronunciation tendency (e.g., a British accent), the processor 7 identifies an audio that exhibits the British pronunciation tendency as the reference audio 5. The processor 7 may identify an audio corresponding to British pronunciation of "SCHEDULE" or the like, which is different from American pronunciation, as the reference audio 5. However, "SCHEDULE" or the like is given for convenience of description, and therefore various reference audios 5 of British pronunciation, which are different from English pronunciation of other countries, may be identified.

The processor 7 performs the misrecognition identification between the user voice 3 of "SCHEDULING" and the reference audio 5 of "SCHEDULE" or the like based on the pronunciation characteristics. To identify misrecognition probability between the user voice 3 of "SCHEDULING" and the reference audio 5 of "SCHEDULE" or the like, the misrecognition may be identified based on, for example, whether the user voice 3 of "SCHEDULING" is recognized as corresponding to the reference audio 5 of "SCHEDULE" or the like, or, in a reverse manner, whether the reference audio 5 of "SCHEDULE" or the like is recognized as corresponding to the user voice 3 of "SCHEDULING".

The processor 7 identifies that the user voice 3 of "SCHEDULING" is not suitable for the start command 4 when it is identified based on a misrecognition identification result that the misrecognition is possible, and does not register the user voice 3 of "SCHEDULING" as the start command 4.

On the other hand, when the user voice 3 of "SHEPPERTON" is received, it may be identified in this regard that the misrecognition is not possible. For example, it may be identified that the user voice 3 of "SHEPPERTON" is not recognized as British pronunciation of "SCHEDULE" or the like, or that British pronunciation of "SCHEDULE" or the like is not recognized as the user voice 3 of "SHEPPERTON". The processor 7 identifies that the user voice 3 of "SHEPPERTON" is suitable for the start command 4, and registers the user voice 3 of "SHEPPERTON" as the start command 4.

Like this, the processor 7 can use the reference audio 5 optimized for the unique characteristics of the user 2, such as the utterance history, the utterance characteristic, etc. of the user 2, and thus improve a resource efficiency, a verification speed and a verification accuracy as compared with those of when the suitability verification is performed based on data unrelated to the unique characteristics of the user 2.

Figure 5:
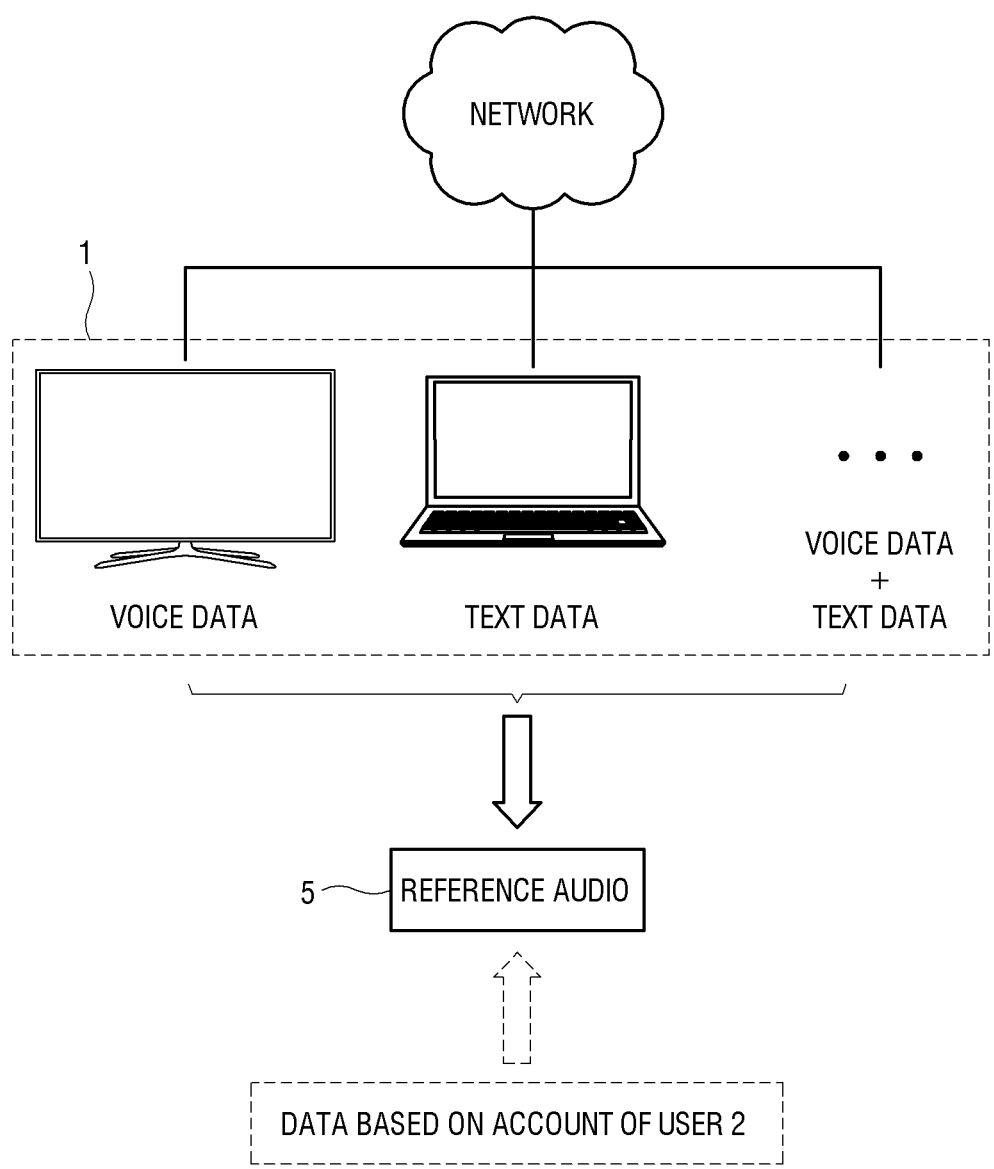
FIG. 5 illustrates an exemplary reference audio based on a use history, in connection with operation S32 of FIG. 3.

FIG. 5 illustrates an exemplary reference audio based on a use history, in connection with operation S32 of FIG. 3.

The reference audio 5 may be obtained or generated based on the use history. The use history includes a use history of another user as well as the user 2, but the use history of the user 2 will be described below for convenience of description.

The use history includes a history of data input to the electronic apparatus 1. The electronic apparatus 1 may be a single electronic apparatus, but may include a plurality of electronic apparatuses 1 or other external apparatuses. The plurality of electronic apparatuses 1 or other external apparatuses may include an Internet of Things (IoT) apparatus connected through a network.

There are no limits to a method of inputting data, and therefore the input data may be received through a microphone or the like audio receiver 26 in each individual apparatus, or through a keyboard or the like input unit. Further, the input data may be previously stored in each individual apparatus.

Because there are no limits to the kinds of input data, the input data may include at least one of voice data or text data. For example, the processor 7 may identify an audio based on voice data input to the electronic apparatus 1 as the reference audio 5, or identify an audio based on at least one of the voice data or the text data input to other external apparatuses as the reference audio 5.

The input data may be based on the account of the user 2. The input data based on the account of the user 2 may, for example, include data input through the plurality of electronic apparatuses 1 or other external apparatuses the account of the user 2 with a logged-in state of the account of the user 2.

The processor 7 may use the reference audio 5 prepared based on the foregoing use history in order to perform the suitability verification of the user voice 3 for the start command 4.

For example, when the user 2 inputs the user voice 3 of "STARTER" to register the start command 4, the processor 7 perform the misrecognition identification between the user voice 3 of "STARTER" and the reference audio 5 based on the use history. The misrecognition may be identified based on whether the user voice 3 of "STARTER" is recognized as corresponding to the reference audio 5 based on the use history, or, in a reverse manner, whether the reference audio 5 based on the use history is recognized as corresponding to the user voice 3 of "STARTER".

When it is identified based on a misrecognition identification result that the misrecognition is possible, the processor 7 identifies that the user voice 3 of "STARTER" is not suitable for the start command 4 and does not register the user voice 3 of "STARTER" as the start command 4.

Like this, the processor 7 can use the reference audio 5 based on the use history, and thus improve the resource efficiency, the verification speed and the verification accuracy as compared with those of when the suitability verification is performed based on data unrelated to the use history.

Figure 6:
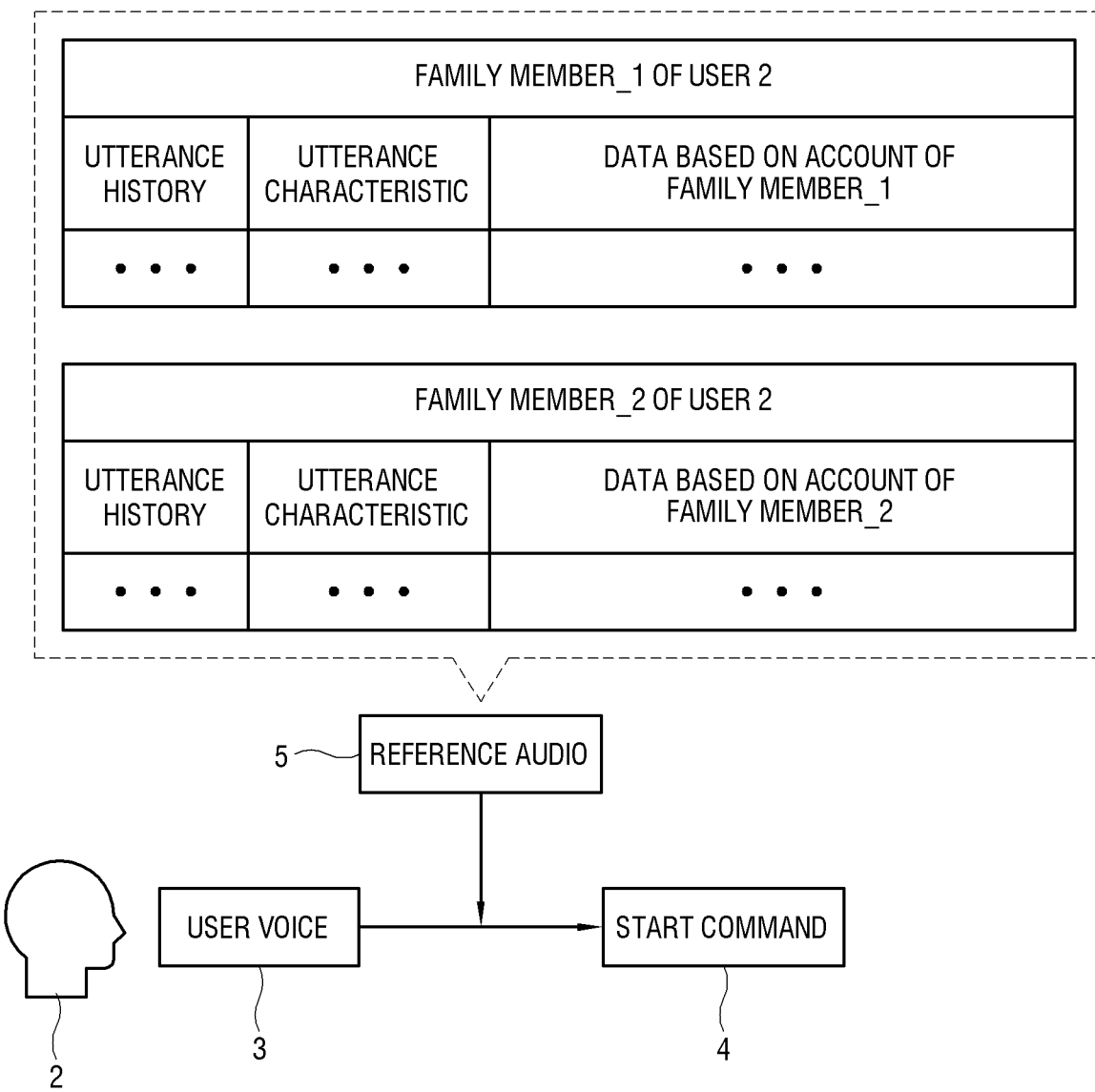
FIG. 6 illustrates an exemplary reference audio about other users, in connection with operation S32 of FIG. 3.

FIG. 6 illustrates an exemplary reference audio about other users, in connection with operation S32 of FIG. 3.

The processor 7 identifies another user related to the user 2. Another user includes users having a certain relationship with the user 2. For example, another user may include a family, friends, etc. of the user 2. However, for convenience of description, it will be described that an audio based on data about family members is used as the reference audio 5 on the assumption that another user is a family member of the user 2.

As shown in FIG. 6, when the user voice 3 to be registered as the start command 4 is received, the processor 7 identifies data about a family member_1 related to the user 2. The data about the family member_1 may include data about the unique characteristics of the family member_1 such as an utterance history, an utterance characteristic, etc. as described above with reference to FIG. 4, and data based on a use history or account of the family member_1 with regard to the electronic apparatus 1 or the external apparatus as described with reference to FIG. 5. The data input by the family member_1 may include at least one of voice data or text data.

The processor 7 may use the audio based on the data about the family member_1 as the reference audio 5 while verifying suitability of the user voice 3 for the start command 4. For example, when the user 2 inputs the user voice 3 of "STARTER" to be registered as the start command 4, the processor 7 performs the misrecognition identification between the user voice 3 of "STARTER" and the reference audio 5 based on the data about the family member_1.

When there is a family member_2 related to the user 2 in addition to the family member_1, the processor 7 may use the audio based on the data about the family member_1 and may also use an audio based on data about the family member_2 as the reference audio 5.

In this manner, the processor 7 can use the reference audio 5 based on data about another user having a relationship with the user 2, and thus improve the resource efficiency, the verification speed and the verification accuracy as compared with those of when the suitability verification is performed based on data of another user irrelevant to the user 2.

Figure 7:
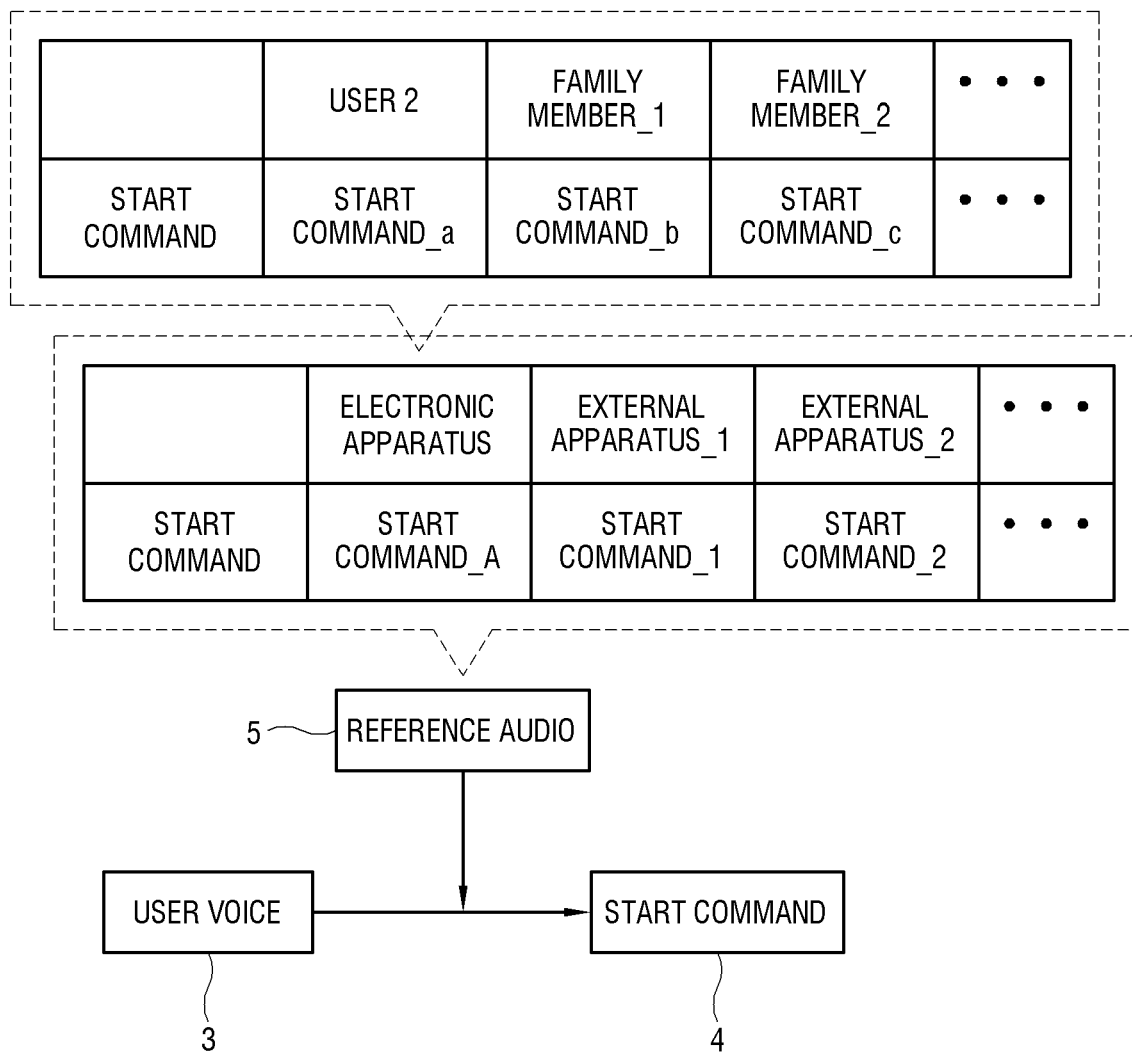
FIG. 7 illustrates an exemplary reference audio about a previously registered start command, in connection with operation S32 of FIG. 3.

FIG. 7 illustrates an exemplary reference audio about a previously registered start command, in connection with the operation S32 of FIG. 3.

The processor 7 may use the start command previously registered in the electronic apparatus 1 as the reference audio 5. The start command previously registered in the electronic apparatus 1 may be registered corresponding to the user 2 or another user related to the user 2. On the assumption that a start command_a corresponding to the user 2, a start command_b corresponding to a family member_1 of the user 2, a start command_c corresponding to a family member_2, etc. are the start commands previously registered in the electronic apparatus 1, the processor 7 may perform the suitability verification of the user voice 3 for the start command 4 based on the misrecognition identification between the user voice 3 to be registered as the start command 4 of the electronic apparatus 1 and the previously registered start command_a, the start command_b, the start command_c or the like.

When the user voice 3 is recognized as corresponding to one of the previously registered start command_a, start command_b, start command_c and the like, the processor 7 may identify that the user voice 3 is not suitable for the start command 4 and does not register the user voice 3 as the start command 4.

On the other hand, when the user voice 3 is not registered as corresponding to one of the previously registered start command_a, start command_b, start command_c and the like, the processor 7 may identify that the user voice 3 is suitable for the start command 4 and register the user voice 3 as the start command 4.

However, the start command previously registered in the electronic apparatus 1 is not limited to the start command registered corresponding to the user 2 or another user, but may include any start command as long as it is previously registered in the electronic apparatus 1.

Meanwhile, the previously registered start command includes a start command previously registered in the electronic apparatus 1 or another external apparatus. The external apparatus may include a network-based IoT apparatus as described above with reference to FIG. 5. For convenience of description, it will be assumed that the electronic apparatus 1 is a TV, an external apparatus_1 is a laptop computer, and a previously registered start command_1 of the laptop computer is "SPEED". When the user voice 3 of "STARTER" to be registered as the start command 4 of the TV is received, the processor 7 identifies the audio based on the previously registered start command_1 of "SPEED" of the laptop computer as the reference audio 5.

The processor 7 may use the audio based on the previously registered start command_1 "SPEED" of the laptop computer as the reference audio 5 to perform the suitability verification of the user voice 3 of "STARTER" for the start command 4. To this end, the processor 7 performs the misrecognition identification between the user voice 3 of "STARTER" and the reference audio 5 based on the start command_1 of "SPEED" previously registered in the laptop computer, and identifies whether the user voice 3 of "STARTER" is registerable as the start command 4 of the TV based on the misrecognition identification result.

When there is a plurality of external apparatuses, the processor 7 may identify at least one external apparatus, in which the start command is registered, among the plurality of external apparatuses, and use the previously registered start command as the reference audio 5 for the at least one external apparatus.

In this manner, the processor 7 can use the reference audio 5 based on the start command of the external apparatus, and thus improve the resource efficiency, the verification speed and the verification accuracy as compared with those of when the suitability verification is performed based on the data irrelevant to the start command of the external apparatus.

Figure 8:
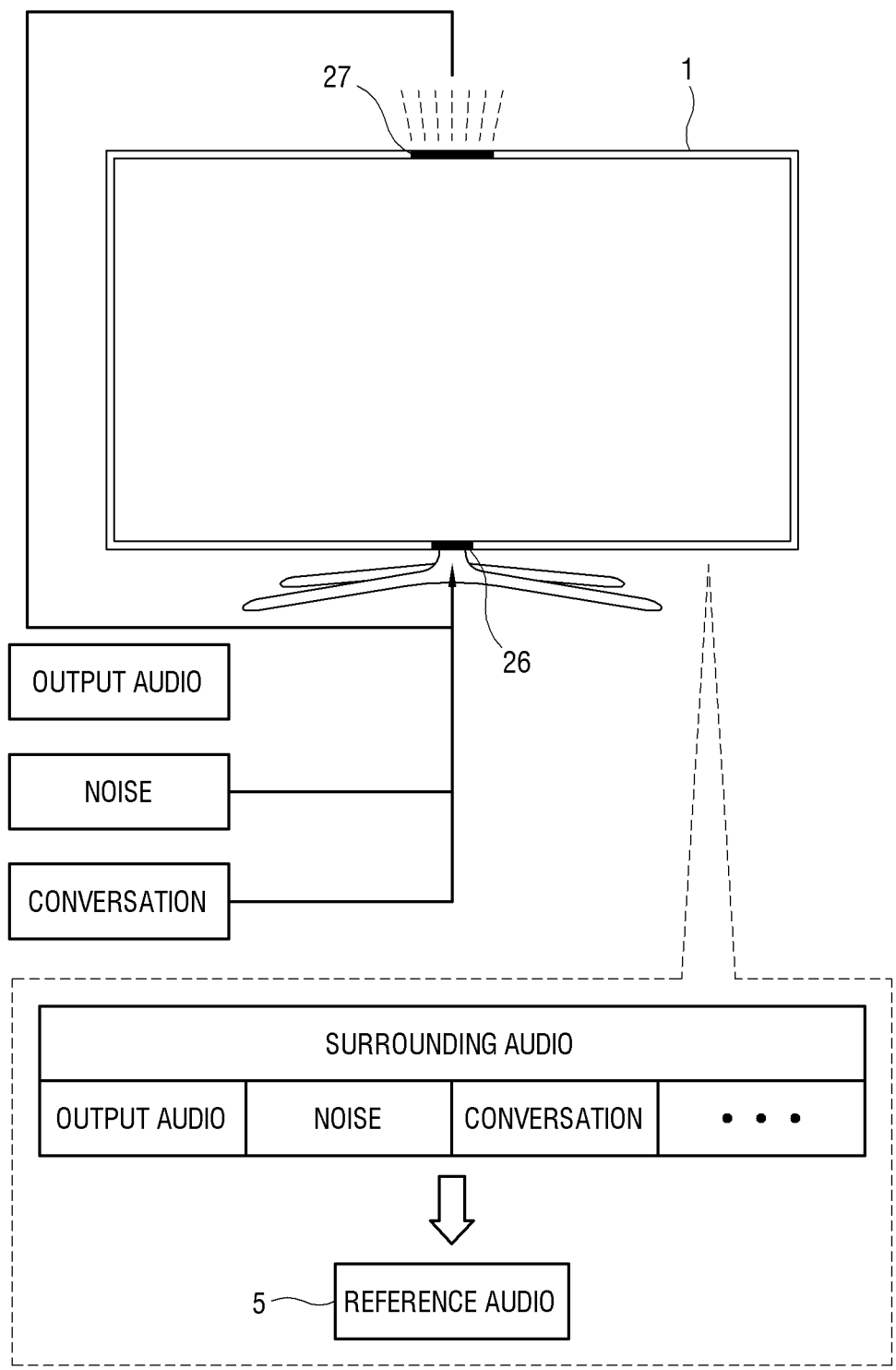
FIG. 8 illustrates an exemplary reference audio about an ambient audio, in connection with operation S32 of FIG. 3.

FIG. 8 illustrates an exemplary reference audio about an ambient audio, in connection with operation S32 of FIG. 3.

The reference audio 5 may be defined based on an ambient audio. The ambient audio may include an audio introduced from the surroundings of the electronic apparatus 1. The ambient audio may be received through the internal audio receiver 26 or the remote controller 6.

Below, an example of the reference audio 5 based on the ambient audio will be described with reference to FIG. 8.

The ambient audio includes an output audio. The output audio includes an audio output based on an audio signal corresponding to an image displayed on the display 24. The image may include an image based on various kinds of content. However, without limitations, the output audio may include an audio output based on a predetermined audio signal.

The ambient audio includes noise. The noise includes various kinds of noise generated around the electronic apparatus 1. For example, the noise includes natural noise such as noise of wind, etc. and also artificial noise such as noise between floors, operation nose of home appliances, etc.

The ambient audio includes ordinary conversation. The ordinary conversation includes voice, chat, talks on a phone, etc. of the user 2 or, for example, a family member related to the user 2 around the electronic apparatus 1.

The processor 7 may identify the ambient audio as the reference audio 5, and perform the suitability verification based on the identified reference audio 5 as described above.

On the assumption that the user voice 3 of "STARTER" for the registration of the start command is received while the electronic apparatus 1 is exposed to construction noise, for example, "BAM-BAM-BAM", the processor 7 may identify the construction noise of "BAM-BAM-BAM" as the reference audio 5, and identify misrecognition between the user voice 3 of "STARTER" and the construction noise "BAM-BAM-BAM".

As described above with reference to FIG. 1, the misrecognition identification may be based on comparison between the audio features, and therefore the processor 7 may identify that the user voice 3 of "STARTER" and the construction noise "BAM-BAM-BAM" have similar audio features and the misrecognition between them is possible. For example, the processor 7 may determine lexical similarity between two words or two phrases, based on a number of characters that overlap between the two words or two phrases, a Euclidean distance between the two words or two phrases, and/or a Levenshtein distance between the two words or two phrases. The processor 7 may identify that the user voice 3 of "STARTER" is not suitable for the start command 4 while being exposed to the construction noise of "BAM-BAM-BAM", and does not register the user voice 3 of "STARTER" as the start command 4. On the other hand, when the audio features of the user voice 3 of "STARTER" and the construction noise "BAM-BAM-BAM" are not similar, the processor 7 may identify that the user voice 3 of "STARTER" is suitable for the start command 4 and register the user voice 3 of "STARTER" as the start command 4 even while being exposed to the construction noise of "BAM-BAM-BAM".

In this manner, the processor 7 can use the reference audio 5 based on the ambient audio, and thus improve the resource efficiency, the verification speed and the verification accuracy as compared with those of when the suitability verification is performed without taking the ambient audio into account.

Figure 9:
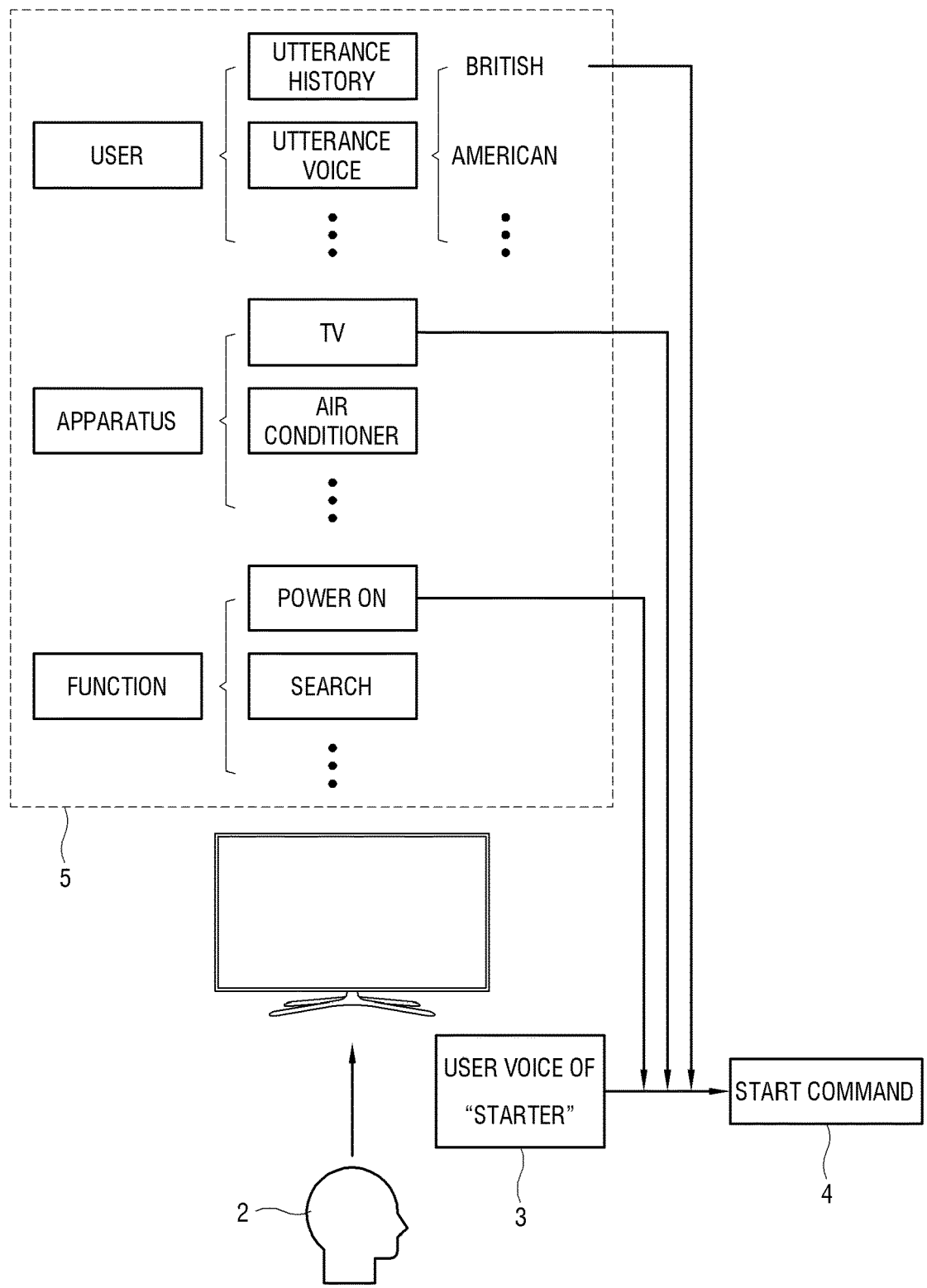
FIG. 9 illustrates an example of grouping a reference audio, in connection with operation S32 of FIG. 3.

FIG. 9 illustrates an example of grouping a reference audio, in connection with operation S32 of FIG. 3.

As described above with reference to FIGS. 4 to 8, the processor 7 obtains the reference audio 5 or reference data to be used as reference of the reference audio 5, and use the reference audio 5 in the suitability verification of the user voice 3 for the start command 4. Below, a method of improving the practical use of the reference audio 5 by more efficiently managing the reference audio 5 or the reference data.

The processor 7 groups the obtained reference data into a plurality of groups. A grouping criterion includes a user criterion, an apparatus criterion, a function criterion, etc. but the present embodiment is not limited thereto. Thus, various criteria may be used to group the reference audio 5.

For example, when the grouping is performed based on the user criterion, the processor 7 identifies whether the obtained data is related to the user 2. When the obtained data is related to the user, the processor 7 groups the obtained data into data of the reference audio 5 corresponding to the user 2.

The data grouped into the data of the reference audio 5 corresponding to the user 2 may be grouped again according to a criterion subordinate to the user criterion. For example, as described above with reference to FIG. 4, the grouping may be performed again according to characteristics, for example, the pronunciation history, of the user 2.

Further, the data grouped into the data of the reference audio 5 corresponding to the pronunciation characteristics of the user 2 may be further grouped according to more subordinate criteria such as a British pronunciation tendency and an American pronunciation tendency.

Like this, the processor 7 groups the obtained data according to the user 2, identifies the reference audio 5 corresponding to the user 2 when the user 2 inputs the user voice 3 to be registered as the start command 4, and performs the suitability verification about the user voice 3 based on the identified reference audio 5. For example, as described with reference to FIG. 4, when it is identified that the user 2 has the British pronunciation tendency, the misrecognition identification between the user voice 3 of "SCHEDULING" and "SCHEDULE" based on the British pronunciation tendency is performed based on the grouped data of the reference audio 5.

Alternatively, when the grouping is performed based on the apparatus criterion, the processor 7 identifies whether the obtained data is related to the electronic apparatus 1 or another external apparatus. For example, when the obtained data is related to the TV 1, the processor 7 groups the obtained data into data of the reference audio 5 corresponding to the TV 1. When the obtained data is related to another external apparatus, the obtained data may be grouped into data of the reference audio 5 corresponding to an air conditioner.

The start command 4 may be registered according to apparatuses. For example, when the user 2 wants to register the start command 4 related to the TV 1, the processor 7 identifies the reference audio 5 corresponding to the TV 1, and performs the suitability verification of the user voice 3 based on the identified reference audio 5.

Alternatively, when the grouping is performed based on the function criterion, the processor 7 identifies what function of the electronic apparatus 1 the obtained data is related to. For example, when the obtained data is related to a power-on function of the TV 1, the processor 7 groups the obtained data into data of the reference audio 5 corresponding to the power-on function of the TV 1. When the obtained data is related to a search function, the obtained data may be grouped into data of the reference audio 5 corresponding to the search function.

The start command 4 may be registered according to the functions. For example, when the user 2 wants to register the start command 4 related to the power-on function of the TV 1, the processor 7 identifies the reference audio 5 corresponding to the power-on function of the TV 1, and performs the suitability verification of the user voice 3 based on the identified reference audio 5.

Like this, the processor 7 can group the obtained data according to predetermined grouping criteria, and use the reference audio 5 based on the grouped data as necessary, thereby further improving the resource efficiency, the verification speed and the verification accuracy in terms of the suitability verification.

Figure 10:
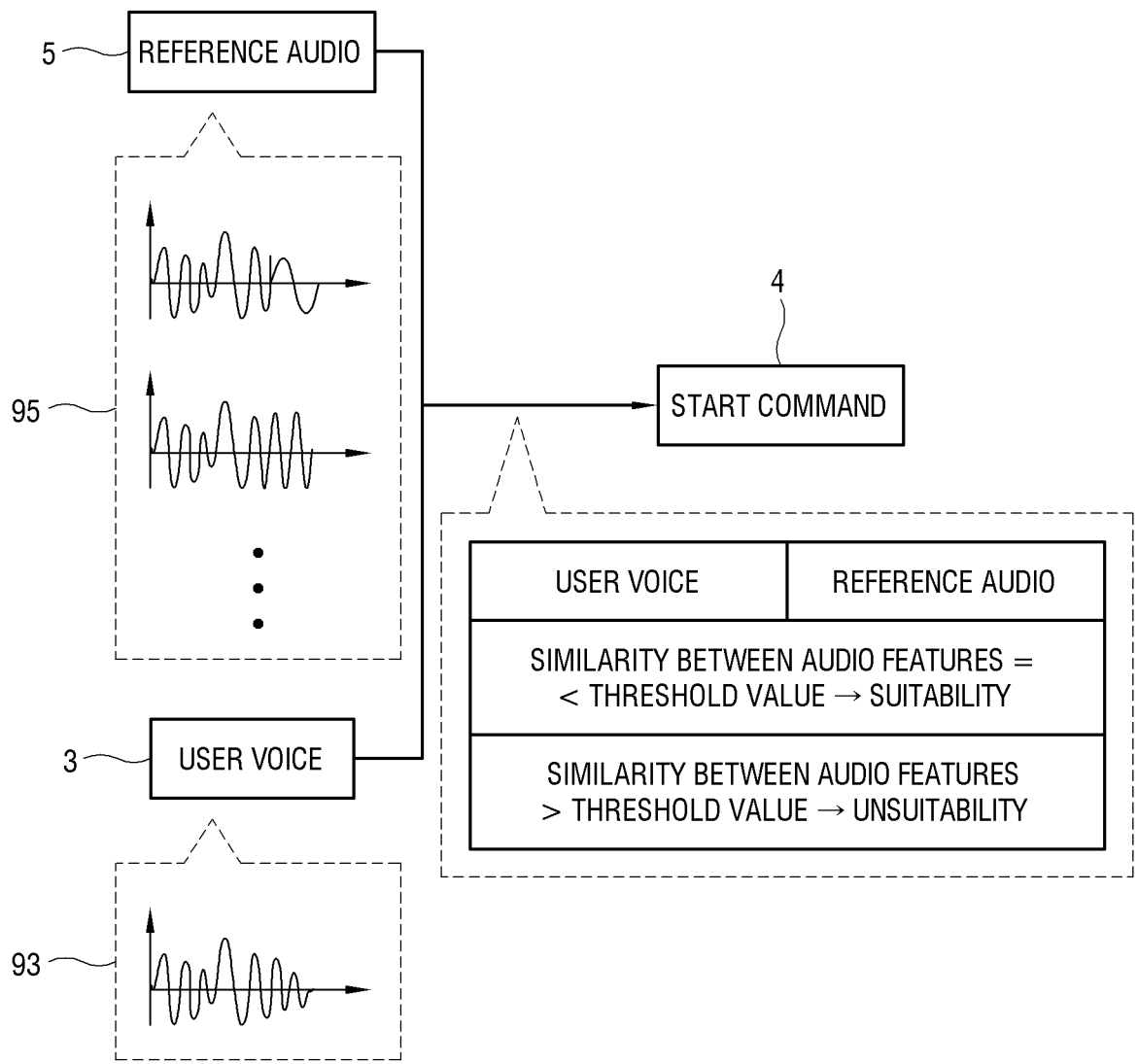
FIG. 10 illustrates an example of identifying suitability, in connection with operation S32 of FIG. 3.

FIG. 10 illustrates an example of identifying suitability, in connection with operation S32 of FIG. 3.

As described above with reference to FIG. 1, the processor 7 may perform comparison in audio features between the user voice 3 and the reference audio 5 in order to verify the suitability. The audio features may include at least one among the pattern, the tone, the volume, the speed, the frequency, the cycle and the amplitude, but it will be described for convenience of description that the misrecognition is identified based on the amplitude.

As shown in FIG. 10, the processor 7 identifies an amplitude 93 of the user voice 3 and a reference amplitude 95 of the reference audio 5 defined in relation to the user 2. The processor 7 may compare the amplitude 93 and the reference amplitude 95 with respect to similarity therebetween. For example, the amplitude 93 and the reference amplitude 95 may be compared with respect to a highest value, a lowest value, an average value, etc. thereby identifying the similarity between the amplitude 93 and the reference amplitude 95.

The processor 7 may give scores according to the similarities as necessary. When the score based on the similarity is lower than or equal to a predetermined threshold, the processor 7 identifies that the misrecognition is not possible, and identifies that the user voice 3 is suitable for the start command 4. On the other hand, when the score based on the similarity is higher than the predetermined threshold, the processor 7 identifies that the misrecognition is possible, and identifies that the user voice 3 is not suitable for the start command 4.

Like this, the processor 7 can identify whether the user voice 3 is suitable for the start command 4 based on similarity between the audio features, thereby further improving the verification speed and the verification accuracy in terms of the suitability verification.

Figure 11:
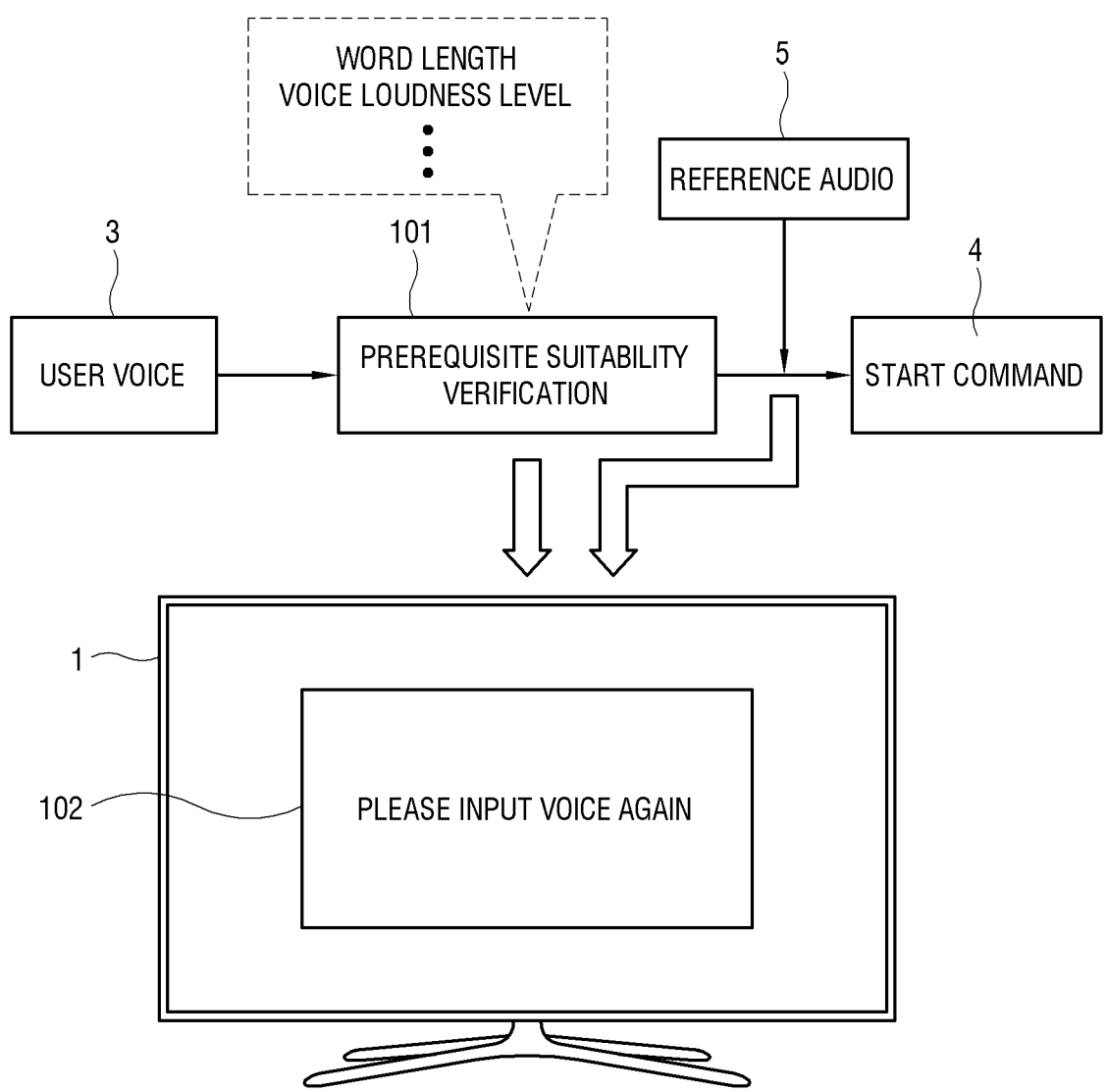
FIG. 11 illustrates an example of performing prerequisite suitability verification, in connection with operation S32 of FIG. 3.

FIG. 11 illustrates an example of performing prerequisite suitability verification, in connection with operation S32 of FIG. 3.

The processor 7 may perform a prerequisite suitability verification 101 on the user voice 3, prior to the suitability verification operation. The foregoing suitability verification employs the reference audio 5 to verify the suitability of the user voice 3, but the prerequisite suitability verification 101 employs a prerequisite suitability criterion without using the reference audio 5.

The prerequisite suitability criterion may include a word length, a voice volume level, and the like of the user voice 3. Below, the word length will be used by way of example to describe the prerequisite suitability verification.

The processor 7 identifies the word length of the user voice 3 when the user voice 3 to be registered as the start command 4 is received. An automatic speech recognition (ASR) engine may be used to recognize the user voice 3 and identify the word length. As described above with reference to FIG. 5, the user voice 3 may be input through the internal audio receiver 26 or the remote controller 6. The user voice 3 may be input in a form of data and/or text data.

When the word length of the user voice 3 is lower than or equal to a predetermined length, the processor 7 may identify that the user voice 3 is not suitable for the start command 4. In this regard, the prerequisite suitability criterion may refer to the minimum suitability for the start command 4. However, the prerequisite suitability criterion is not limited to the word length, but may include various criteria such a voice loudness level, etc. according to designs.

When the prerequisite suitability criterion is not satisfied, the processor 7 may display a user interface (UI) 102 to request the user voice 3 again. However, such a request is not limited to the display of the UI 102, but an audio for requesting the user voice 3 again may be output through the output interface 27.

When the prerequisite suitability criterion is satisfied, the processor 7 may generate an acoustic model based on the user voice 3. The processor 7 may compare the acoustic model, which satisfies the prerequisite suitability criterion, with the foregoing reference audio 5, thereby finally identifying whether the user voice 3 is valid as the start command 4. The suitability verification based on the acoustic model will be described in more detail with reference to FIG. 12.

Meanwhile, the display of the UI 102 or the like for requesting the user voice 3 again is not limited to the case where the prerequisite suitability criterion is not satisfied, and therefore applicable even in the acoustic model where the user voice 3 is not suitable for the start command 4 about.

As described with reference to FIG. 7, the misrecognition identification includes the misrecognition identification of the existing acoustic model of the verified suitability for the start command 4. When there is a confliction with the existing acoustic model due to possible misrecognition, the UI 102 for deleting the existing acoustic model or updating the existing acoustic model with a new acoustic model may be displayed. Like this, the processor 7 can perform the prerequisite suitability verification of the user voice 3 through a simple procedure, and thus further improve the resource efficiency in terms of the suitability verification.

Figure 12:
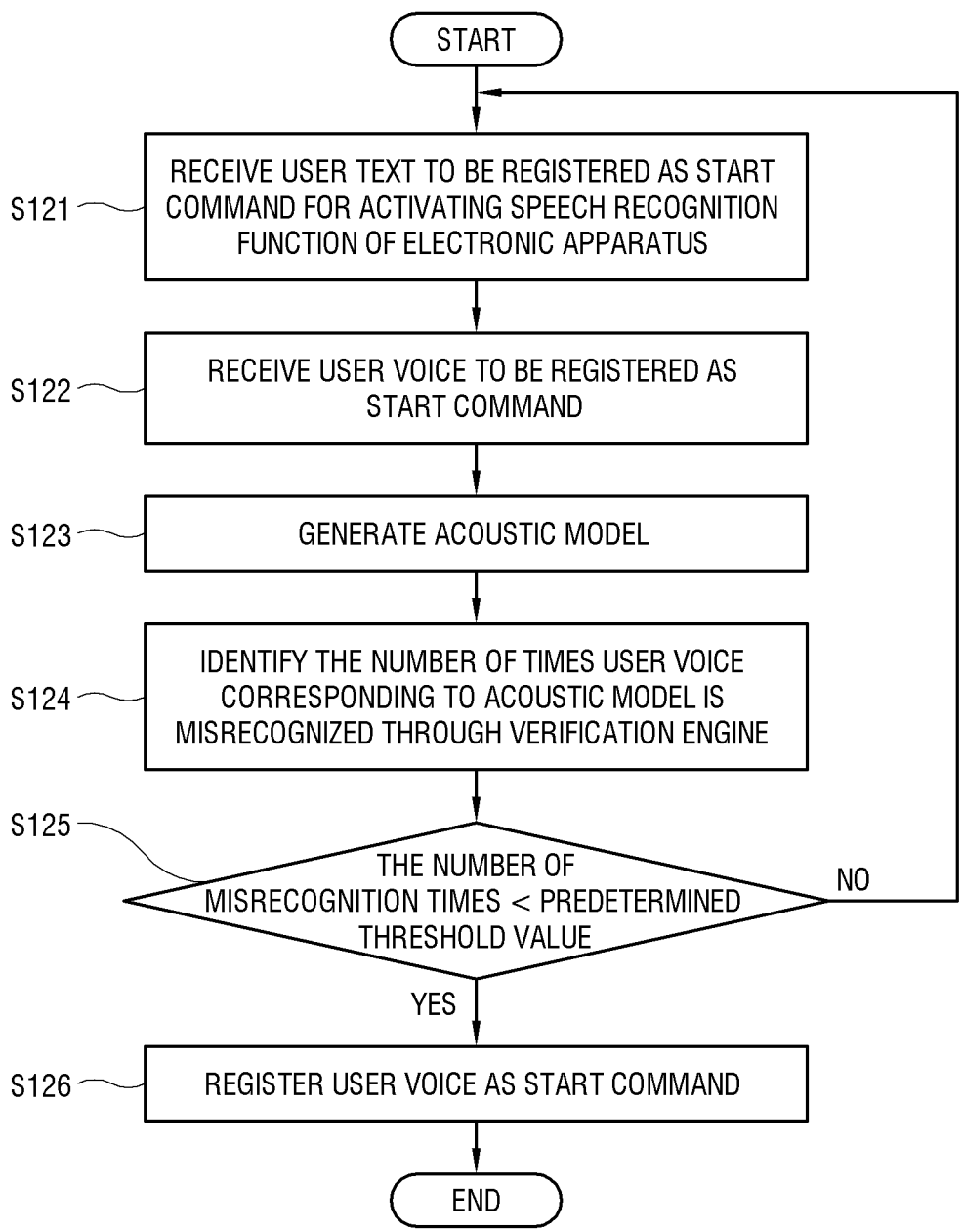
FIG. 12 illustrates an example of identifying suitability based on an acoustic model, in connection with operation S32 of FIG. 3.

FIG. 12 illustrates an example of identifying suitability based on an acoustic model, in connection with the operation S32 of FIG. 3.

The operations set forth herein with reference to FIG. 12 are executed by the processor 7 of the electronic apparatus 1. Further, different operations from those of FIG. 3 will be described avoiding the repetitive descriptions as necessary.

The processor 7 may receive a user text for registering the start command 4 of the electronic apparatus 1 (operation S121). For example, the user 2 may input a user text of "STARTER" through a keyboard or the like input.

The processor 7 may receive the user voice 3 for registering the start command 4 (operation S122). For example, when the user voice 3 of "STARTER" is input, the processor 7 performs the prerequisite suitability verification based on the user voice 3 of "STARTER" and the user text of "STARTER" input in operation S121, as described above with reference to FIG. 11.

The processor 7 may allow the user 2 to utter the user voice 3 of "STARTER" more than a predetermined number of times for the accuracy of the prerequisite suitability verification. For example, the UI 102 may be used to request the user 2 to utter the user voice 3 more than a predetermined number of times.

The processor 7 may generate the acoustic model (operation S123). The acoustic model may be generated based on the user voice 3 passing the prerequisite suitability verification. The acoustic model may be achieved by a hardware/software component corresponding to the user voice 3.

The processor 7 identifies the number of misrecognition times with regard to the user voice 3 corresponding to the acoustic model through a verification engine (operation S124). As described above, the verification engine may be configured based on various reference audios 5, and achieved by a hardware/software component. For example, when there is a start command previously registered in the electronic apparatus 1, the verification engine may involve an acoustic model based on the previously registered start command.

The misrecognition may be identified based on whether the acoustic model passes the verification engine, in other words, comparison in audio features between the user voice 3 corresponding to the acoustic model and the reference audio 5 corresponding to the verification engine.

When the number of misrecognition times is lower than or equal to a predetermined threshold value (operation S125), the processor 7 may identify that the user voice 3 corresponding to the acoustic model is suitable, and register the user voice 3 as the start command 4 (operation S126). For example, when the number of times the acoustic model does not pass the verification engine is lower than or equal to a predetermined threshold value, or when the number of times the misrecognition is possible as a result of comparison in audio features between the user voice 3 corresponding to the acoustic model and the reference audio 5 corresponding to the verification engine is lower than or equal to a predetermined threshold value, it is identified that the user voice 3 is suitable.

On the other hand, when the number of misrecognition times is higher than a predetermined threshold value, the processor 7 may identify that the user voice 3 is not suitable and do not register the user voice 3 as the start command 4. For example, when the number of times the acoustic model does not pass the verification engine is higher than a predetermined threshold value, or when the number of times the misrecognition is possible as a result of comparison in audio features between the user voice 3 corresponding to the acoustic model and the reference audio 5 corresponding to the verification engine is higher than a predetermined threshold value, it is identified that the user voice 3 is not suitable.

Meanwhile, the suitability verification for the acoustic model may be applied to network-based IoT apparatuses. For convenience of description, it will be assumed that an external apparatus together with the electronic apparatus 1 forms the IoT network, and the acoustic model is present corresponding to the external apparatus.

When the user voice 3 to be registered as the start command 4 of the electronic apparatus 1 is received, the processor 7 may set the verification engine based on the acoustic model of the external apparatus. For example, when the acoustic model of the external apparatus is the start command previously registered in the external apparatus, the verification engine may be configured to be based on the reference audio 5 about the start command previously registered in the external apparatus.

The processor 7 may use the verification engine based on the acoustic model of the external apparatus to perform the suitability verification about the acoustic model generated for the electronic apparatus 1 based on operation S123. In other words, the number of times the user voice 3 corresponding to the acoustic model of the electronic apparatus 1 is misrecognized may be identified (operation S124).

When the number of misrecognition times is lower than or equal to a predetermined threshold value (operation S125), the processor 7 identifies that the user voice 3 corresponding to the acoustic model of the electronic apparatus 1 is suitable, and registers the user voice 3 as the start command 4 (operation S126). On the other hand, when the number of misrecognition times is higher than a predetermined threshold value, the processor 7 identifies that the user voice 3 corresponding to the acoustic model of the electronic apparatus 1 is not suitable, and does not register the user voice 3 as the start command 4.

Like this, the processor 7 can use the verification engine to identify the number of times the user voice 3 corresponding to the acoustic model is misrecognized, and perform the suitability verification based on the number of misrecognition times, thereby further improving the verification accuracy.

Figure 13:
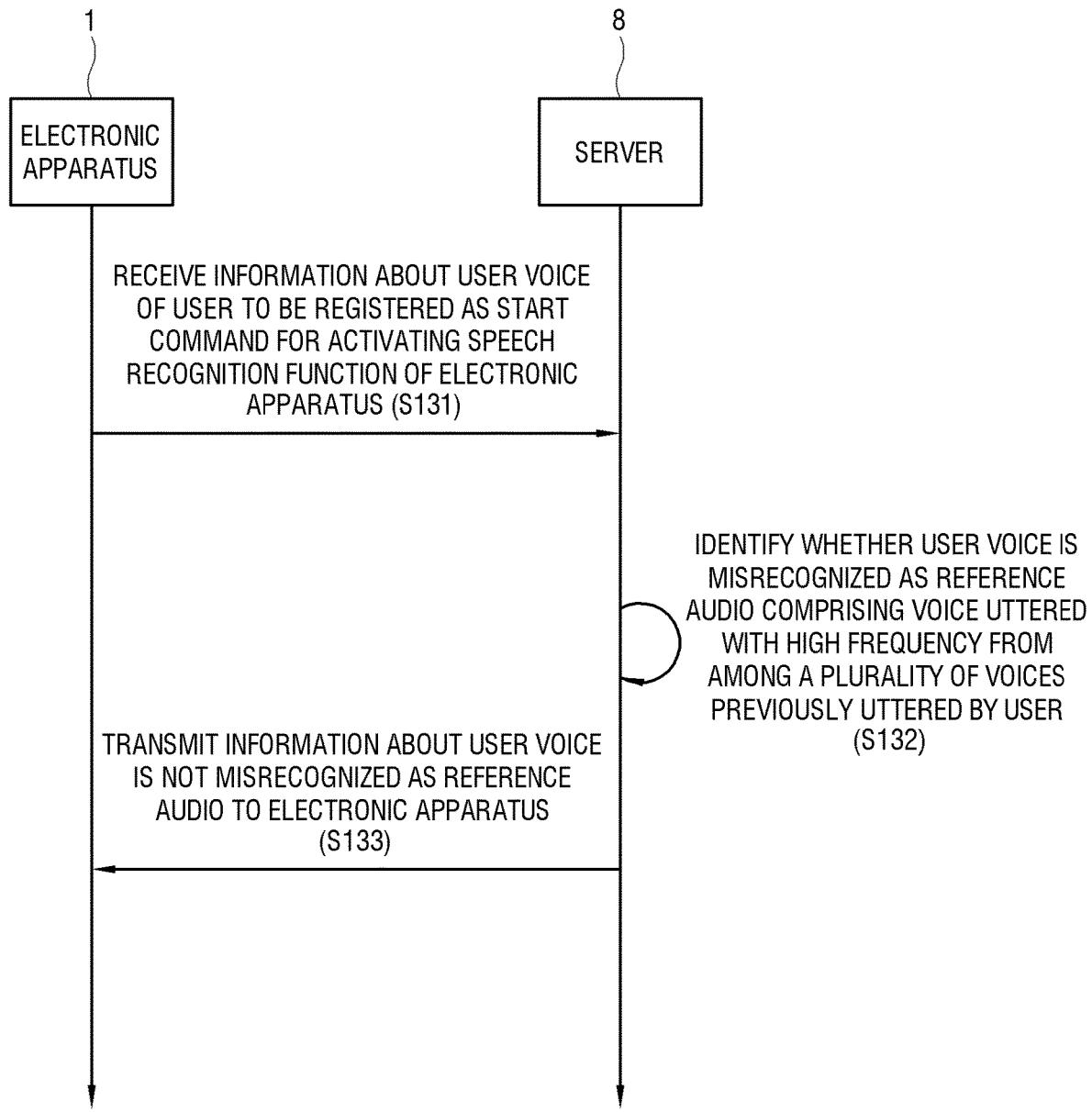
FIG. 13 illustrates an exemplary control method of the server in FIG. 2.

FIG. 13 illustrates an exemplary control method of the server in FIG. 2.

The operations set forth herein are executed by the server processor 9 of the server 8.

As shown in FIG. 13, the server processor 9 receives information about the user voice 3 of the user 2 to be registered as the start command 4 for activating the speech recognition function of the electronic apparatus 1 (operation S131).

The server processor 9 identifies whether the user voice 3 is likely to be misrecognized as the reference audio 5, wherein the reference audio 4 includes a voice which is uttered by the user 2 with high frequency from among a plurality of voices previously uttered by the user 2 (operation S132).

The server processor 9 transmits the information about whether the user voice 3 is not likely to be misrecognized as the reference audio to the electronic apparatus 1 (operation S133).

The electronic apparatus 1 registers the user voice 3, which passes the suitability verification, as the start command 4 based on information received from the server 8, and activates the speech recognition function when the user voice 3 is received after the registration.

Meanwhile, the operations of the processor 7 described with reference to FIG. 3 or the operations of the server processor 9 described with reference to FIG. 13 may be designed to be performed in one processor or shared between the processors 7 and 9. For example, the resource conditions, the network conditions, the capacity of the reference audio 5 contrasted with the user voice 3, etc. may be taken into account to thereby identify which operations the processor 7 or the server processor 9 will perform.

Like this, the server processor 9 can verify the suitability of the user voice 3 for the start command 4 in the voluntary registration process of the start command 4, and thus use the reference audio 5 corresponding to the user 2, in other words, the reference audio 5 optimized for the user 2. Therefore, the resource efficiency, the verification speed and the verification accuracy are improved, and the practical use of the start command 4 and the convenience in using the speech recognition function are improved.

Various embodiments of the disclosure are achieved by software including one or more commands stored in a storage medium readable by the electronic apparatus 1 and the like (machine). For example, the processor 7 of the electronic apparatus 1 may call and execute at least one command among one or more stored commands from the storage medium. This enables the electronic apparatus 1 and the like apparatus to operate and perform at least one function based on the at least one called command. The one or more commands includes a code produced by a compiler or a code executable by an interpreter. The machine-readable storage medium may be provided in the form of a non-transitory storage medium. Here, the 'non-transitory' merely means that the storage medium is a tangible device and does not include a signal (for example, an electromagnetic wave), and this term does not distinguish between cases of being semi-permanently and temporarily stored in the storage medium. For instance, the 'non-transitory storage medium' may include a buffer in which data is temporarily stored.

For example, the method according to various embodiments of the disclosure is provided as involved in a computer program product. The computer program product according to the disclosure includes instructions of software to be executed by the processor as mentioned above. The computer program product is traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product (e.g., a downloadable app) may be transitorily stored or temporarily produced in a machine-readable storage medium such as a memory of a manufacturer server, an application-store server, or a relay server.

Although a few exemplary embodiments have been shown and described, the present invention does not limit to the few exemplary embodiments, and carries out in a various ways within the scope of the claims.

The invention claimed is:

1. An electronic apparatus comprising
a processor configured to:
   receive a user voice of a user to be registered as a start command for activating a speech recognition function of the electronic apparatus;
   identify whether the user voice is misrecognized as a reference audio comprising a voice uttered with high frequency from among a plurality of voices previously uttered by the user; and
   based on the user voice being not misrecognized as the reference audio, register the user voice as the start command.

2. The electronic apparatus according to claim 1, wherein data of the reference audio comprises data about at least one of a user utterance characteristic or a user utterance history.

3. The electronic apparatus according to claim 1, wherein data of the reference audio comprises data obtained based on an account of the user.

4. The electronic apparatus according to claim 1, wherein data of the reference audio comprises data of a text input in relation to the user.

5. The electronic apparatus according to claim 1, wherein data of the reference audio comprises data of another user.

6. The electronic apparatus according to claim 1, wherein data of the reference audio comprises data of another start command registered in an external apparatus different from the electronic apparatus.

7. The electronic apparatus according to claim 1, wherein the reference audio comprises an audio obtained around the electronic apparatus.

8. The electronic apparatus according to claim 1, wherein the processor is further configured to identify whether the user voice is misrecognized as the reference audio based on similarity in audio features between the user voice and the reference audio.

9. The electronic apparatus according to claim 1, wherein the processor is further configured to identify whether the user voice is misrecognized as the reference audio based on a length of a word contained in the user voice.

10. The electronic apparatus according to claim 1, wherein the processor is further configured to group the reference audio into a plurality of groups based on functions of the electronic apparatus, and identify whether the user voice is misrecognized as the reference audio based on the reference audio of the group corresponding to the user voice.

11. An electronic apparatus comprising:
an interface; and
a processor configured to:
receive, from an external apparatus through the interface, information about a user voice of a user to be registered as a start command for activating a speech recognition function of the external apparatus;
identify whether the user voice is misrecognized as a reference audio comprising a voice uttered with high frequency from among a plurality of voices previously uttered by the user; and
control the interface to transmit, to the external apparatus, information about whether the user voice is not misrecognized as the reference audio.

12. A method of controlling an electronic apparatus, the method comprising:
receiving a user voice of a user to be registered as a start command for activating a speech recognition function of the electronic apparatus;
identifying whether the user voice is misrecognized as a reference audio comprising a voice uttered with high frequency from among a plurality of voices previously uttered by the user; and
based on the user voice being not misrecognized as the reference audio, registering the user voice as the start command.

13. The method according to claim 12, wherein data of the reference audio comprises data about at least one of a user utterance characteristic or a user utterance history.

14. The method according to claim 12, wherein data of the reference audio comprises data obtained based on an account of the user.

15. The method according to claim 12, wherein data of the reference audio comprises data of a text input in relation to the user.

16. The method according to claim 12, wherein data of the reference audio comprises data of another user.

17. The method according to claim 12, wherein data of the reference audio comprises data of another start command registered in an external apparatus different from the electronic apparatus.

18. The method according to claim 12, wherein the reference audio comprises an audio obtained around the electronic apparatus.

19. A method of controlling an electronic apparatus, the method comprising:
receiving, from an external apparatus, information about a user voice of a user to be registered as a start command for activating a speech recognition function of the external apparatus;
identifying whether the user voice is misrecognized as a reference audio comprising a voice uttered with high frequency from among a plurality of voices previously uttered by the user; and
transmitting, to the external apparatus, information about the user voice is not misrecognized as the reference audio.

20. A non-transitory computer-readable storage medium storing a computer program that is executable at least one processor to perform a method of controlling an electronic apparatus, the method comprising:
receiving a user voice of a user to be registered as a start command for activating a speech recognition function of the electronic apparatus;
identifying whether the user voice is misrecognized as a reference audio comprising a voice uttered with high frequency from among a plurality of voices previously uttered by the user; and
based on the user voice being not misrecognized as the reference audio, registering the user voice as the start command.

* * * * *